(12) United States Patent
Nonogaki

(10) Patent No.: US 9,762,076 B2
(45) Date of Patent: Sep. 12, 2017

(54) ELECTRONIC DEVICE, METHOD OF TRANSMITTING ELECTRIC POWER, AND ELECTRIC POWER TRANSMISSION SYSTEM

(71) Applicant: KYOCERA Corporation, Kyoto-shi, Kyoto (JP)

(72) Inventor: Masatoshi Nonogaki, Daito (JP)

(73) Assignee: KYOCERA Corporation, Kyoto (JP)

( * ) Notice: Subject to any disclaimer, the term of this patent is extended or adjusted under 35 U.S.C. 154(b) by 115 days.

(21) Appl. No.: 14/669,360

(22) Filed: Mar. 26, 2015

(65) Prior Publication Data

US 2015/0280478 A1 Oct. 1, 2015

(30) Foreign Application Priority Data

Mar. 26, 2014 (JP) ................................ 2014-063821

(51) Int. Cl.
*H01M 10/46* (2006.01)
*H02J 7/00* (2006.01)

(52) U.S. Cl.
CPC .......... *H02J 7/0054* (2013.01); *H02J 7/0004* (2013.01); *H02J 7/007* (2013.01); *H02J 2007/0062* (2013.01)

(58) Field of Classification Search
CPC ...... H02J 7/0009; H02J 7/0021; H02J 7/0026; H02J 2007/0062; H02J 7/0063
USPC .......................... 320/114, 115, 129, 133, 135
See application file for complete search history.

(56) References Cited

U.S. PATENT DOCUMENTS

| 2012/0072042 A1* | 3/2012 | Moriai | H02J 7/0013 |
| | | | 700/297 |
| 2014/0035521 A1 | 2/2014 | Endo | |
| 2015/0244176 A1* | 8/2015 | Van Den Brink | H02J 5/005 |
| | | | 307/104 |

FOREIGN PATENT DOCUMENTS

| JP | 2006-085248 A | 3/2006 |
| JP | 2006-287628 A | 10/2006 |
| JP | 2012-110157 A | 6/2012 |
| JP | 2014-33504 A | 2/2014 |

OTHER PUBLICATIONS

Office Action dated May 9, 2017 issued in counterpart Japanese Application No. 2014-063821.

* cited by examiner

*Primary Examiner* — Edward Tso
(74) *Attorney, Agent, or Firm* — Procopio Cory Hargreaves and Savitch LLP

(57) ABSTRACT

A mode setting module sets a mode of a smartphone B to an electric power transmission mode or an electric power reception mode based on a state of use of a smartphone A and the smartphone B. An electric power control module allows electric power transmission of electric power transmission and electric power reception when the electric power transmission mode is set, and allows electric power reception of electric power transmission and electric power reception when the electric power reception mode is set.

13 Claims, 20 Drawing Sheets

ELECTRONIC DEVICE, METHOD OF TRANSMITTING ELECTRIC POWER, AND ELECTRIC POWER TRANSMISSION SYSTEM

CROSS-REFERENCE TO RELATED APPLICATION

The present application claims priority under 35 U.S.C. §119 to Japanese Patent Application No. 2014-063821 filed on Mar. 26, 2014, entitled "Electronic Device, Method of Transmitting Electric Power, and Electric Power Transmission System." The content of which is incorporated by reference herein in its entirety.

FIELD

An embodiment of the present disclosure relates to an electronic device, a method of transmitting electric power, and an electric power transmission system, and particularly to a technique for transmitting electric power between electronic devices such as a plurality of portable terminals.

BACKGROUND

An electronic device having a universal serial bus (USB) host function has been known. Such an electronic device can supply electric power to another electronic device. When two electronic devices having the USB host function are connected through a USB, an electric power transmission side and an electric power reception side of the two electronic devices can be interchanged so long as they have a role swapping function.

SUMMARY

An electronic device in one embodiment includes a battery, an electric power transmission module configured to be able to transmit electric power in the battery to another electronic device, an electric power reception module configured to be able to receive electric power from another electronic device and have received electric power stored in the battery, a setting module configured to set a mode of the electronic device to an electric power transmission mode or an electric power reception mode based on a state of use of the electronic device and another electronic device, and a control module configured to allow electric power transmission of electric power transmission and electric power reception when the electric power transmission mode is set and allow electric power reception of electric power transmission and electric power reception when the electric power reception mode is set.

DETAILED DESCRIPTION

Embodiments will be described hereinafter with reference to the drawings.

When two electronic devices having a USB host function are connected to each other through a USB, in spite of the fact that the two electronic devices each have a function inherent in an electronic device, a device set as an electric power transmission side may not be able to perform the function inherent in the electronic device. When any one of two electronic devices is set as the electric power transmission side and the other is set as an electric power reception side, a result unfavorable to a user may be produced. Embodiments below overcome such a disadvantage.

Embodiment 1

Figure 1:
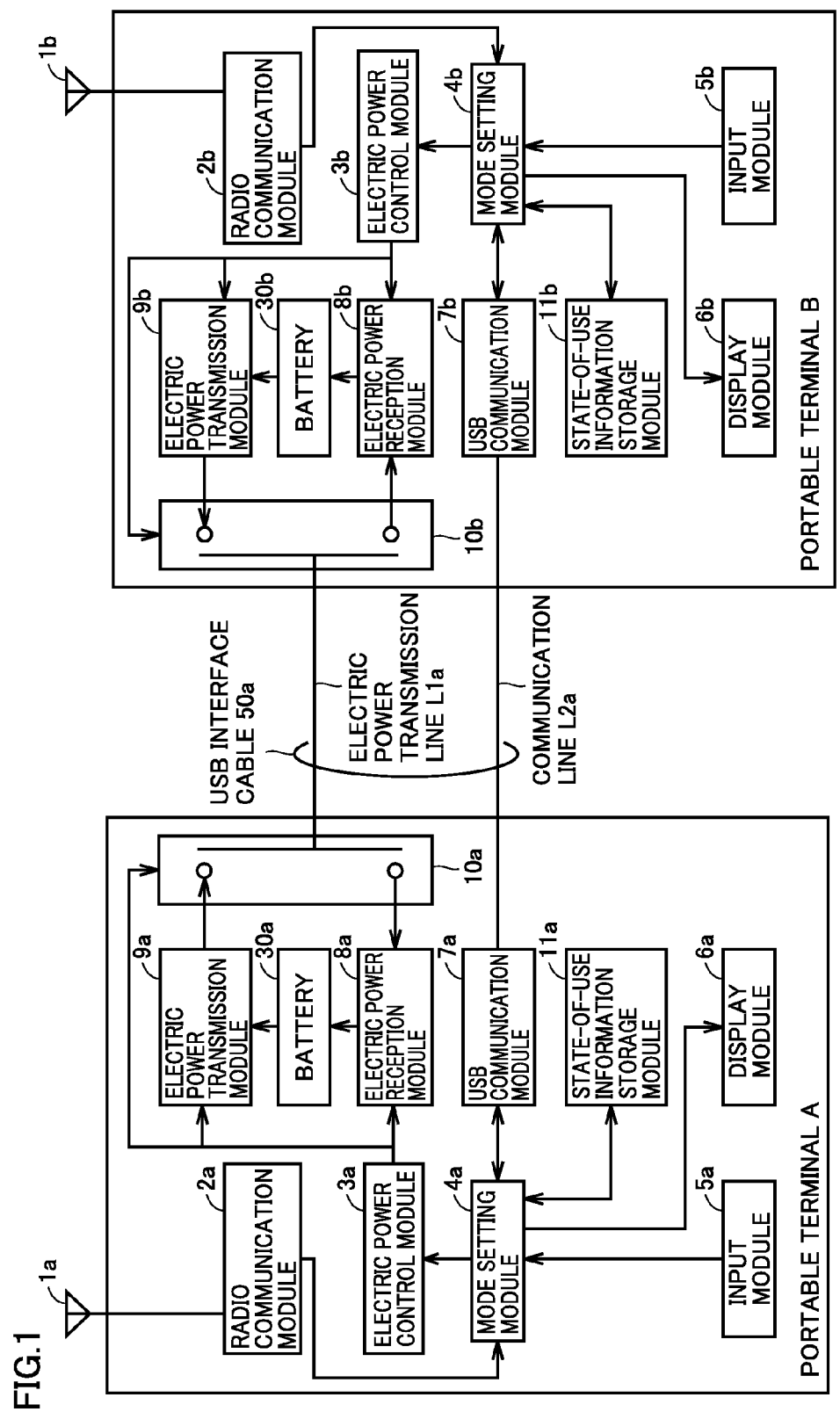
FIG. 1 is a diagram representing an electric power transmission system configured with two portable terminals.

FIG. 1 is a diagram representing an electric power transmission system configured with two portable terminals.

A portable terminal A includes an antenna 1a, a radio communication module 2a, a mode setting module 4a, an electric power control module 3a, an electric power transmission module 9a, an electric power reception module 8a, a switch 10a, a battery 30a, a USB communication module 7a, an input module 5a, and a display module 6a.

Radio communication module 2a can establish radio communication with a radio base station through antenna 1a.

Electric power transmission module 9a can transmit electric power in battery 30a to portable terminal B through an electric power transmission line L1a of USB interface cable 50a.

Electric power reception module 8a can carry out charging with electric power from portable terminal B through an electric power transmission line L1a of USB interface cable 50a and can have electric power stored in battery 30a.

Switch 10a can connect electric power transmission line L1a of USB interface cable 50a to electric power transmission module 9a or electric power reception module 8a.

USB communication module 7a can communicate various types of information including information on a state of use with portable terminal B through a communication line L2a of USB interface cable 50a.

Input module 5a can be implemented by a touch panel and can accept an input from a user.

Display module 6a can be implemented by a liquid crystal display.

Mode setting module 4a can set portable terminal A to an electric power transmission mode or an electric power reception mode based on a state of use of portable terminal A and portable terminal B. Mode setting module 4a can determine a mode of portable terminal A and portable terminal B when the mode setting module receives information on the state of use of portable terminal B from portable terminal B.

When the mode is set to the electric power transmission mode, electric power control module 3a can instruct electric power transmission module 9a to transmit electric power such that electric power transmission module 9a and electric power transmission line L1a are connected to each other.

Portable terminal B can also include features similar to those in portable terminal A.

Figure 2:
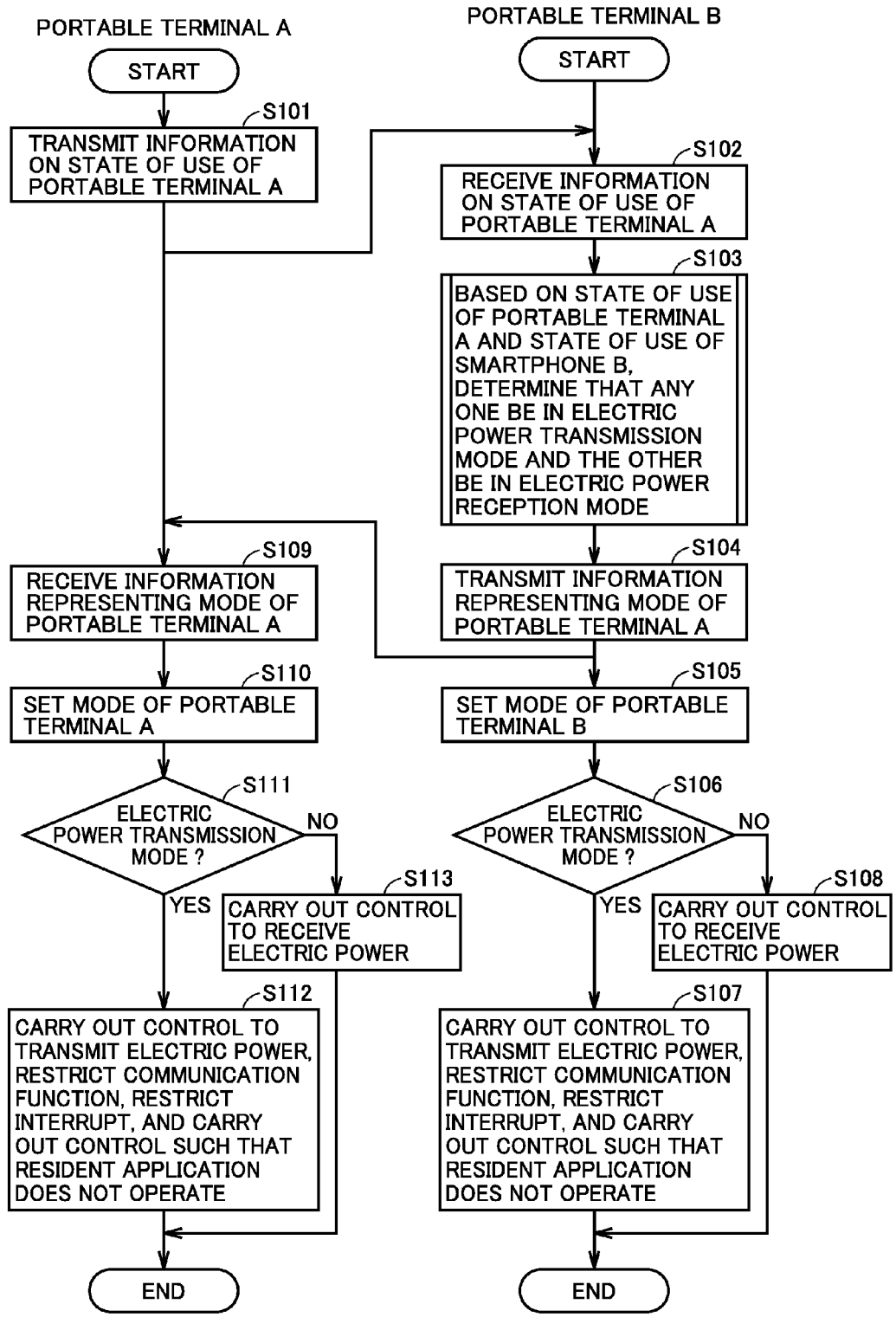
FIG. 2 is a flowchart representing a procedure for transmitting electric power between a portable terminal A and a portable terminal B in Embodiment 1.

FIG. 2 is a flowchart representing a procedure for transmitting electric power between portable terminal A and portable terminal B in Embodiment 1. This flowchart represents a processing procedure in a case that portable terminal B determines a mode of portable terminal A and portable terminal B.

Referring to FIG. 2, in step S101, USB communication module 7a of portable terminal A can transmit information on a state of use of portable terminal A.

In step S102, USB communication module 7b of portable terminal B can receive information on a state of use of portable terminal A.

In step S103, mode setting module 4b of portable terminal B can decide the mode of any one of portable terminal A and portable terminal B on the electric power transmission mode and decide a mode of the other on the electric power reception mode based on the received information on the state of use of portable terminal A and information on a state of use of portable terminal B which is stored in a not-shown memory.

In step S104, USB communication module 7b of portable terminal B can transmit information representing the mode of portable terminal A.

In step S105, mode setting module 4b of portable terminal B can set the mode of portable terminal B to the mode determined in step S103.

When the electric power transmission mode is set in step S106, the process proceeds to step S107, and when the electric power reception mode is set, the process proceeds to step S108.

In step S107, electric power control module 3b can carry out control to allow electric power transmission of electric power transmission and electric power reception. Specifically, electric power control module 3b can have switch 10b connected to electric power transmission module 9b and can have electric power transmission module 9b output electric power stored in battery 30b. Electric power control module 3b can restrict a function of communication by radio communication module 2b, can restrict an interrupt by an alarm or the like, and can carry out control such that a resident application does not operate.

In step S108, electric power control module 3b can carry out control to allow electric power reception of electric power transmission and electric power reception. Specifically, electric power control module 3b can have switch 10b connected to electric power reception module 8b and can have electric power reception module 8b store received electric power in battery 30b.

In step S109, USB communication module 7a of portable terminal A can receive information representing the mode of portable terminal A.

In step S110, mode setting module 4a of portable terminal A can set the mode of portable terminal A to the mode received in step S109.

When the electric power transmission mode is set in step S111, the process proceeds to step S112, and when the electric power reception mode is set, the process proceeds to step S113.

In step S112, electric power control module 3a can carry out control to allow electric power transmission of electric power transmission and electric power reception. Specifically, electric power control module 3a can have switch 10a connected to electric power transmission module 9a and can have electric power transmission module 9a output electric power stored in battery 30a. Electric power control module 3a can restrict a function of communication by radio communication module 2a, can restrict an interrupt by an alarm or the like, and can carry out control such that a resident application does not operate.

In step S113, electric power control module 3a can carry out control to allow electric power reception of electric power transmission and electric power reception. Specifically, electric power control module 3a can have switch 10a connected to electric power reception module 8a and can have electric power reception module 8a store received electric power in battery 30a.

(Example of Information on State of Use)

In Embodiment 1, a remaining amount of the battery of portable terminals A and B can be used as the information on the state of use.

Figure 3:
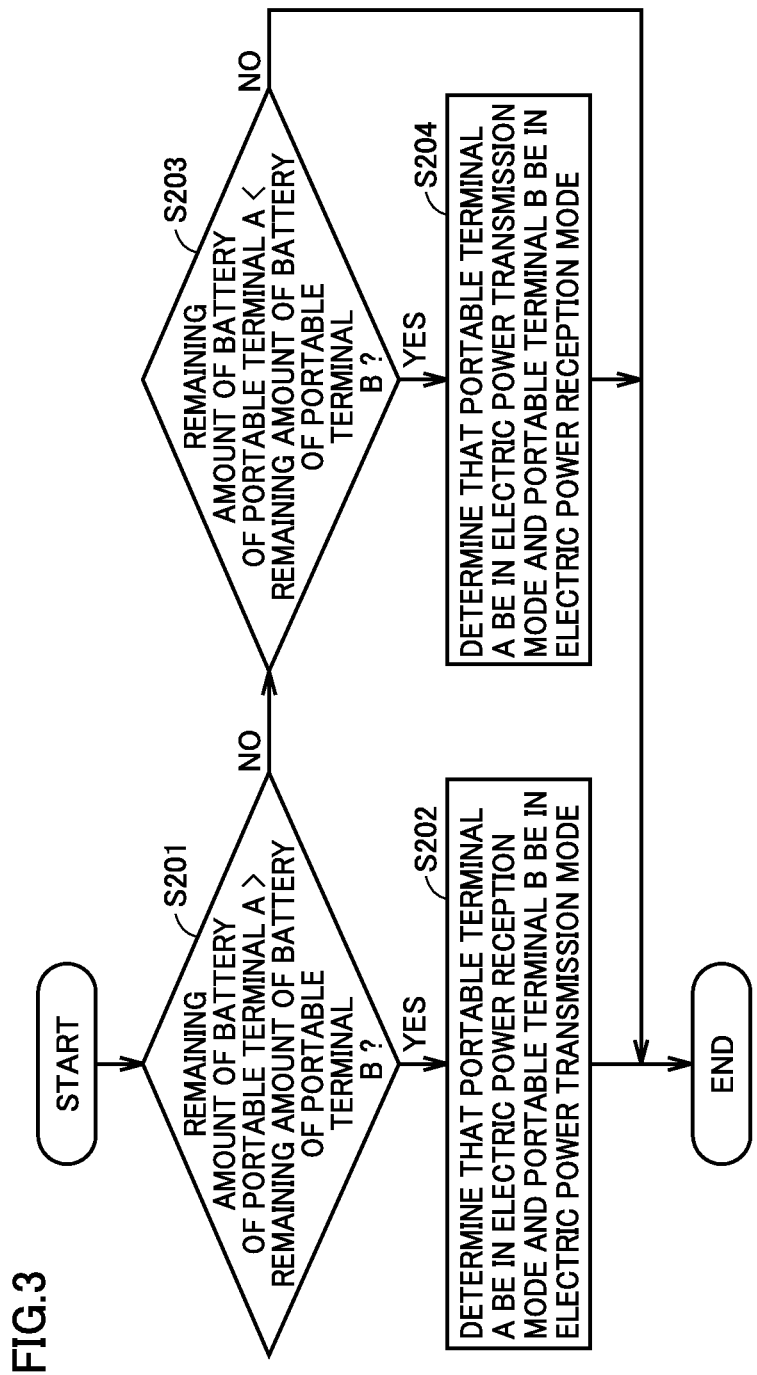
FIG. 3 is a flowchart representing a method of determining a mode in Embodiment 1.

FIG. 3 is a flowchart representing a method of determining a mode in Embodiment 1.

Referring to FIG. 3, in step S201, when a remaining amount of the battery of portable terminal A is greater than a remaining amount of the battery of portable terminal B, the process proceeds to step S202. When a remaining amount of the battery of portable terminal B is greater than a remaining amount of the battery of portable terminal A, the process proceeds to step S204.

In step S202, mode setting module 4b can decide the mode of portable terminal A on the electric power reception mode and can decide the mode of portable terminal B on the electric power transmission mode.

In step S204, mode setting module 4b can decide the mode of portable terminal A on the electric power transmission mode and can decide the mode of portable terminal B on the electric power reception mode.

As above, according to Embodiment 1, since a portable terminal greater in remaining amount of the battery of the two portable terminals can receive supply of electric power from a portable terminal smaller in remaining amount of the battery, a user can continue to use a portable terminal greater in remaining amount of the battery for a long time.

In Embodiment 1, portable terminal A can transmit information on a state of use of portable terminal A to portable terminal B and portable terminal B can determine a mode of portable terminal A and portable terminal B based on the information on the state of use of portable terminal A and the information on the state of use of portable terminal B, however, limitation thereto is not intended. In contrast, portable terminal B may transmit information on a state of use of portable terminal B to portable terminal A and portable terminal A may determine a mode of portable terminal A and portable terminal B. Alternatively, each of portable terminal A and portable terminal B may transmit information on a state of use of the portable terminal itself to a counterpart, and the portable terminal itself may determine a mode of the portable terminal itself. This is also applicable to embodiments below.

Embodiment 2

In Embodiment 2, a frequency of use of portable terminals A and B can be used as the information on the state of use. As the frequency of use, for example, a duration of a telephone call, a duration of communication, a duration of use of an application, an amount of transmission or reception of data per unit time, or a duration of an operation of a portable terminal by a user can be used.

Figure 4:
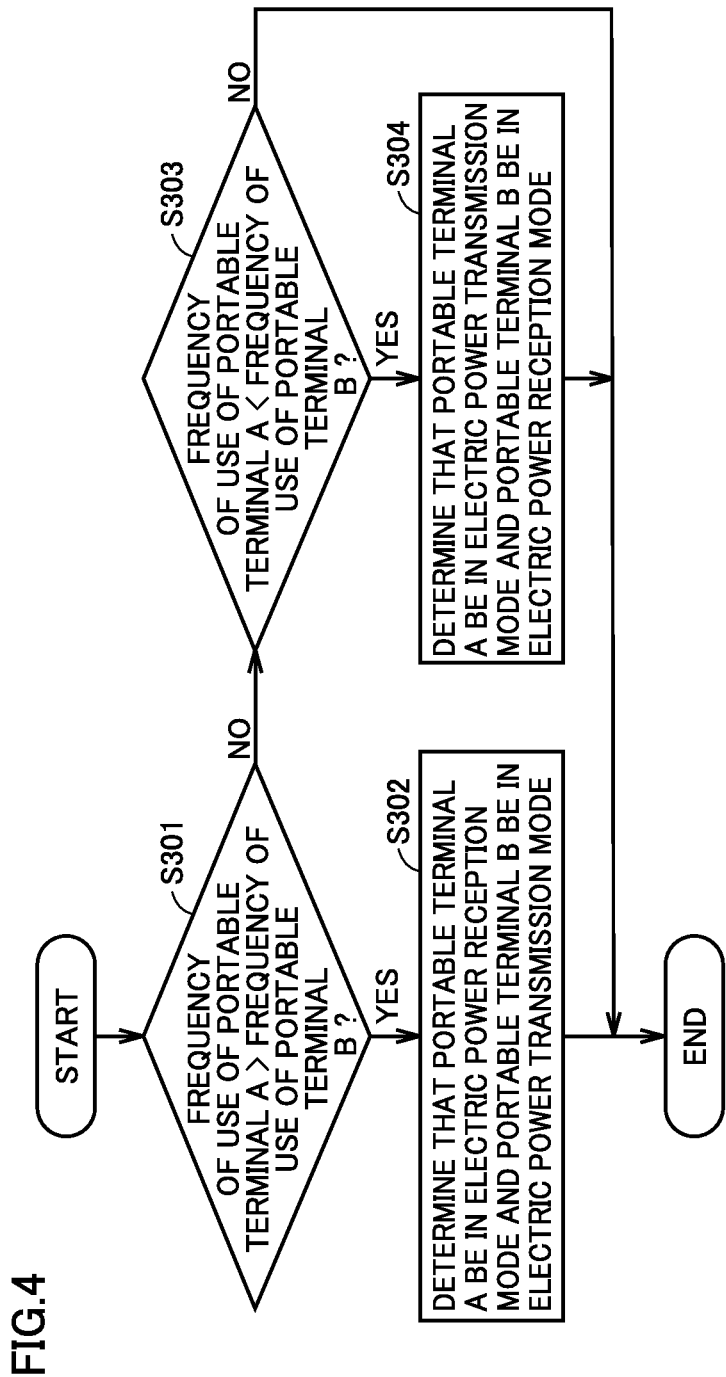
FIG. 4 is a flowchart representing a method of determining a mode in Embodiment 2.

FIG. 4 is a flowchart representing a method of determining a mode in Embodiment 2.

Referring to FIG. 4, in step S301, when a frequency of use of portable terminal A is higher than a frequency of use of portable terminal B, the process proceeds to step S302. When a frequency of use of portable terminal B is higher than a frequency of use of portable terminal A, the process proceeds to step S304.

In step S302, mode setting module 4*b* can decide the mode of portable terminal A on the electric power reception mode and can decide the mode of portable terminal B on the electric power transmission mode.

In step S304, mode setting module 4*b* can decide the mode of portable terminal A on the electric power transmission mode and can decide the mode of portable terminal B on the electric power reception mode.

As above, according to Embodiment 2, since a portable terminal higher in frequency of use of the two portable terminals can receive supply of electric power from a portable terminal lower in frequency of use, the user can continue to use a portable terminal higher in frequency of use for a long time.

Embodiment 3

In Embodiment 3, a function level of portable terminals A and B can be used as the information on the state of use. As a function level, a type of a portable terminal, an operating system (OS) for operating a portable terminal, or the like can be used. For example, when portable terminals A and B are different from each other in version of the OS, a portable terminal of which version of the OS is newer can be determined as being higher in the function level. When any of portable terminals A and B is a smartphone and the other is a feature phone, the smartphone can be determined as being higher in the function level.

Figure 5:
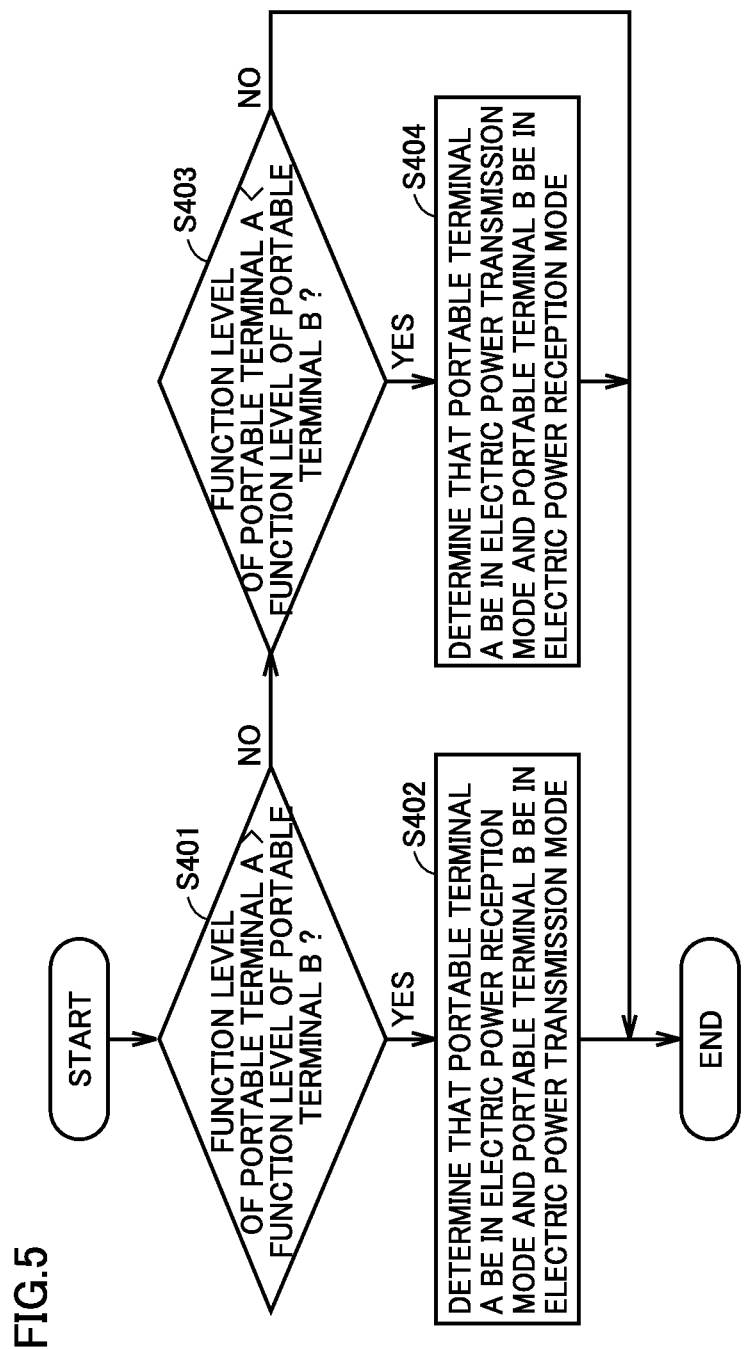
FIG. 5 is a flowchart representing a method of determining a mode in Embodiment 3.

FIG. 5 is a flowchart representing a method of determining a mode in Embodiment 3.

Referring to FIG. 5, when a function level of portable terminal A is higher than a function level of portable terminal B in step S401, the process proceeds to step S402. When a function level of portable terminal B is higher than a function level of portable terminal A, the process proceeds to step S404.

In step S402, mode setting module 4*b* can decide the mode of portable terminal A on the electric power reception mode and can decide the mode of portable terminal B on the electric power transmission mode.

In step S404, mode setting module 4*b* can decide the mode of portable terminal A on the electric power transmission mode and can decide the mode of portable terminal B on the electric power reception mode.

As above, according to Embodiment 3, since a portable terminal higher in the function level of the two portable terminals can receive supply of electric power from a portable terminal lower in the function level, the user can continue to use a portable terminal higher in the function level for a long time.

Embodiment 4

In Embodiment 4, a communication quality level of portable terminals A and B is used as the information on the state of use. As a communication quality level, for example, intensity of received radio waves or a frame error rate can be used.

Figure 6:
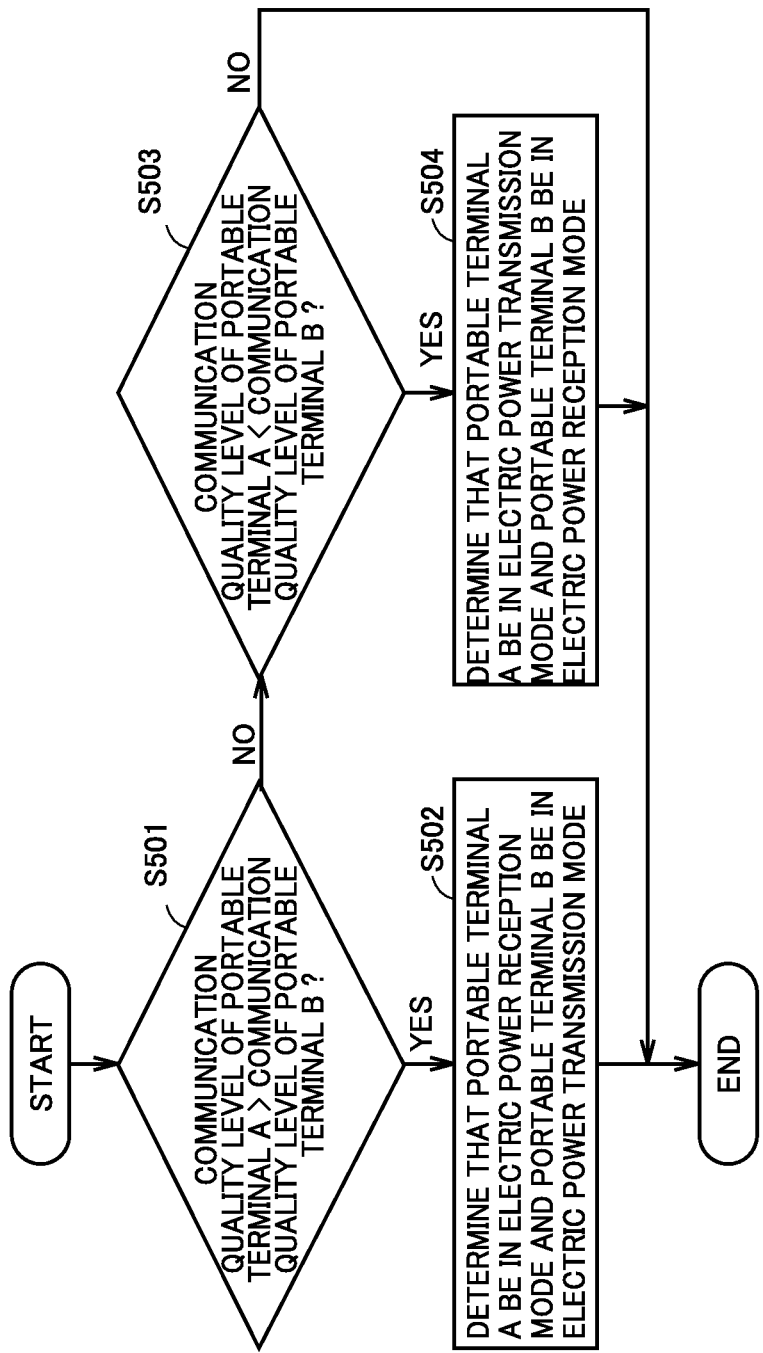
FIG. 6 is a flowchart representing a method of determining a mode in Embodiment 4.

FIG. 6 is a flowchart representing a method of determining a mode in Embodiment 4.

Referring to FIG. 6, in step S501, when a communication quality level of portable terminal A is higher than a communication quality level of portable terminal B, the process proceeds to step S502. When the communication quality level of portable terminal B is higher than the communication quality level of portable terminal A, the process proceeds to step S504.

In step S502, mode setting module 4*b* can decide the mode of portable terminal A on the electric power reception mode and can decide the mode of portable terminal B on the electric power transmission mode.

In step S504, mode setting module 4*b* can decide the mode of portable terminal A on the electric power transmission mode and can decide the mode of portable terminal B on the electric power reception mode.

As above, according to Embodiment 4, since a portable terminal higher in the communication quality level of the two portable terminals can receive supply of electric power from a portable terminal lower in the communication quality level, the user can continue to use a portable terminal higher in the communication quality level for a long time.

Embodiment 5

In Embodiment 5, whether portable terminals A and B are within or out of coverage can be used as the information on the state of use.

Figure 7:
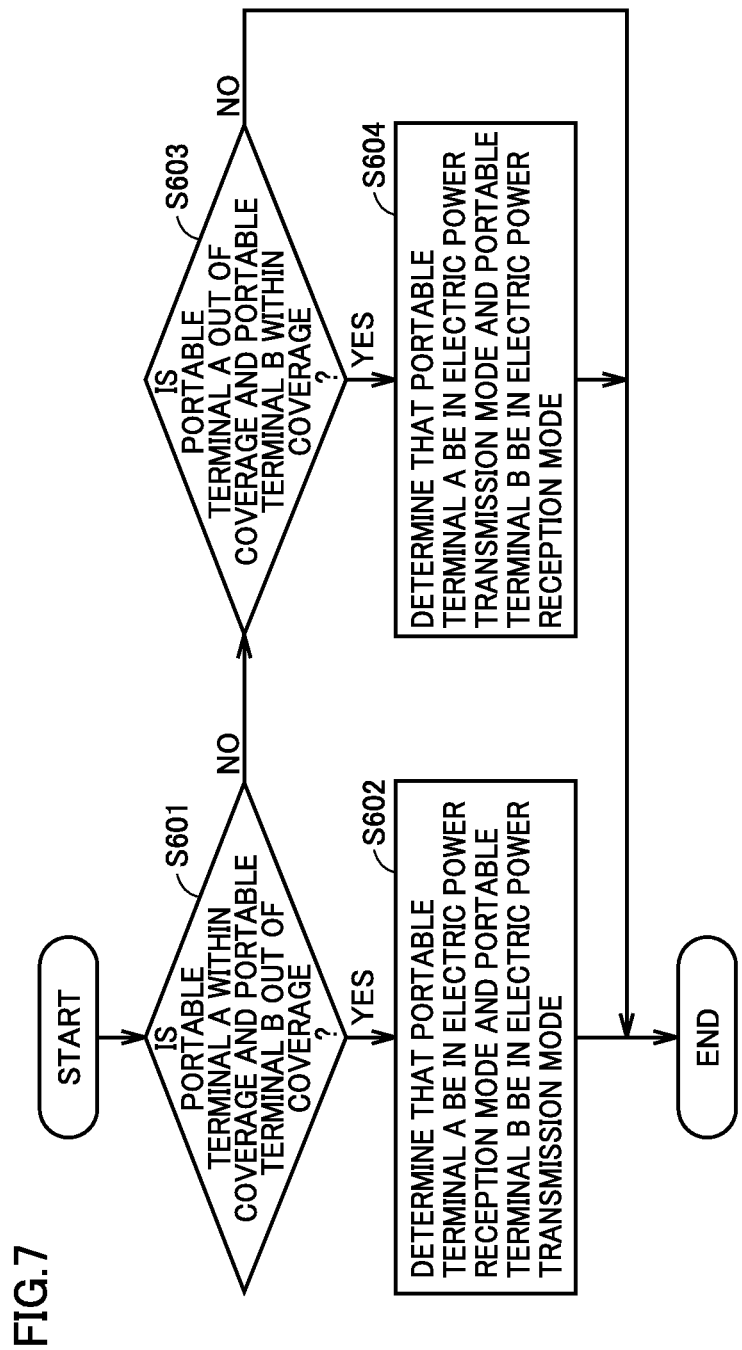
FIG. 7 is a flowchart representing a method of determining a mode in Embodiment 5.

FIG. 7 is a flowchart representing a method of determining a mode in Embodiment 5.

Referring to FIG. 7, in step S601, when portable terminal A is within coverage and portable terminal B is out of coverage, the process proceeds to step S602. When portable terminal B is within coverage and portable terminal A is out of coverage, the process proceeds to step S604.

In step S602, mode setting module 4*b* can decide the mode of portable terminal A on the electric power reception mode and can decide the mode of portable terminal B on the electric power transmission mode.

In step S604, mode setting module 4b can decide the mode of portable terminal A on the electric power transmission mode and can decide the mode of portable terminal B on the electric power reception mode.

As above, according to Embodiment 5, since a portable terminal within coverage of the two portable terminals can receive supply of electric power from a portable terminal out of coverage, the user can continue to use a portable terminal within coverage for a long time.

Embodiment 6

In Embodiment 6, an item determined by a user as an item to be prioritized among the remaining amount of the battery, the frequency of use, the function level, and the communication quality level can be used as the information on the state of use.

Figure 8:
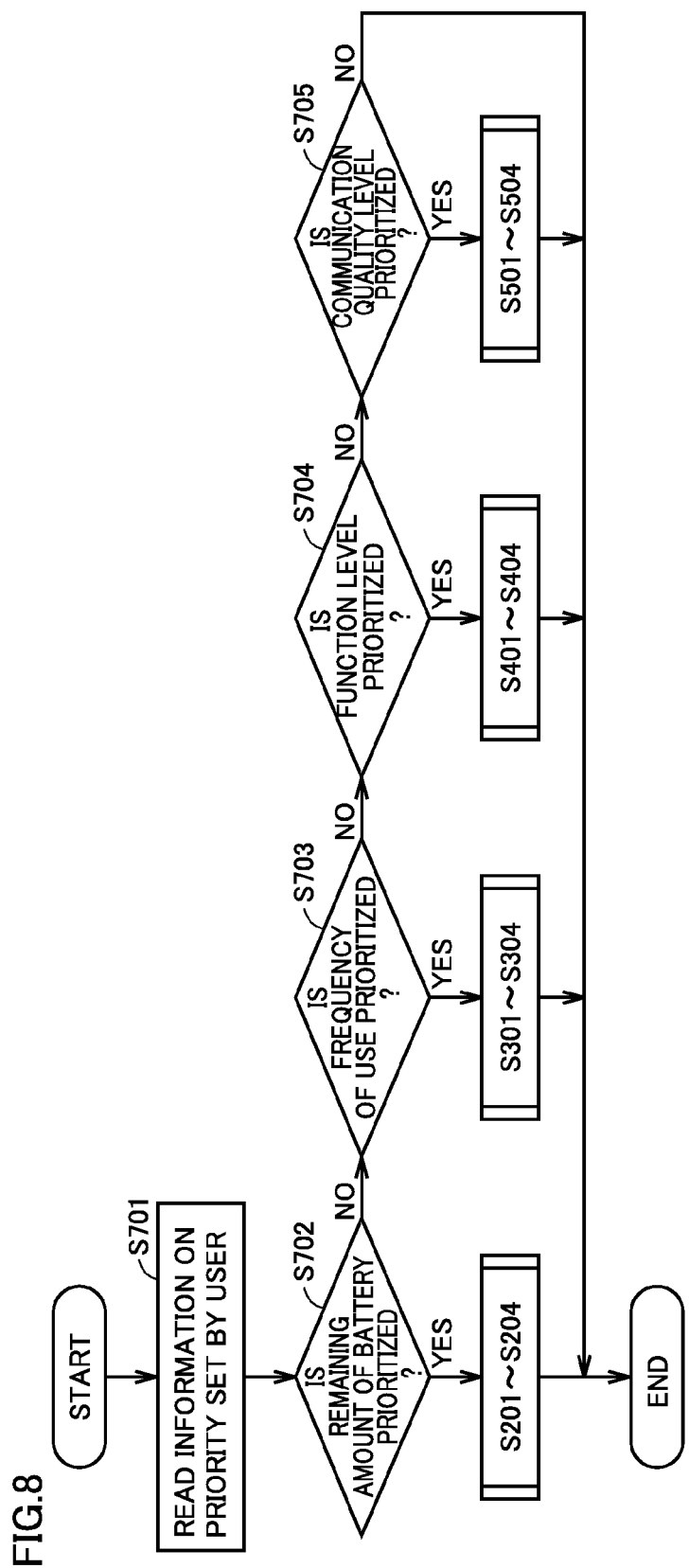
FIG. 8 is a flowchart representing a method of determining a mode in Embodiment 6.

FIG. 8 is a flowchart representing a method of determining a mode in Embodiment 6.

Referring to FIG. 8, in step S701, mode setting module 4b can read information on priority set by a user in advance through input module 5b and stored in a not-shown memory.

When prioritization of the remaining amount of the battery is determined in the priority information (YES in step S702), mode setting module 4b can perform the processing in steps S201 to S204 in FIG. 3.

When prioritization of the frequency of use is determined in the priority information (YES in step S703), mode setting module 3b can perform the processing in steps S301 to S304 in FIG. 4.

When prioritization of the function level is determined in the priority information (YES in step S704), mode setting module 4b can perform the processing in steps S401 to S404 in FIG. 5.

When prioritization of the communication quality level is determined in the priority information (YES in step S705), mode setting module 4b can perform the processing in steps S501 to S504 in FIG. 6.

As above, according to Embodiment 6, based on an item selected by the user from among the remaining amount of the battery, the frequency of use, the function level, and the communication quality level, any of the two portable terminals can be set to the electric power reception mode and the other can be set to the electric power transmission mode.

Embodiment 7

In Embodiment 7, all of the remaining amount of the battery, the frequency of use, the function level, and the communication quality level can be used together as the information on the state of use.

Figure 9:
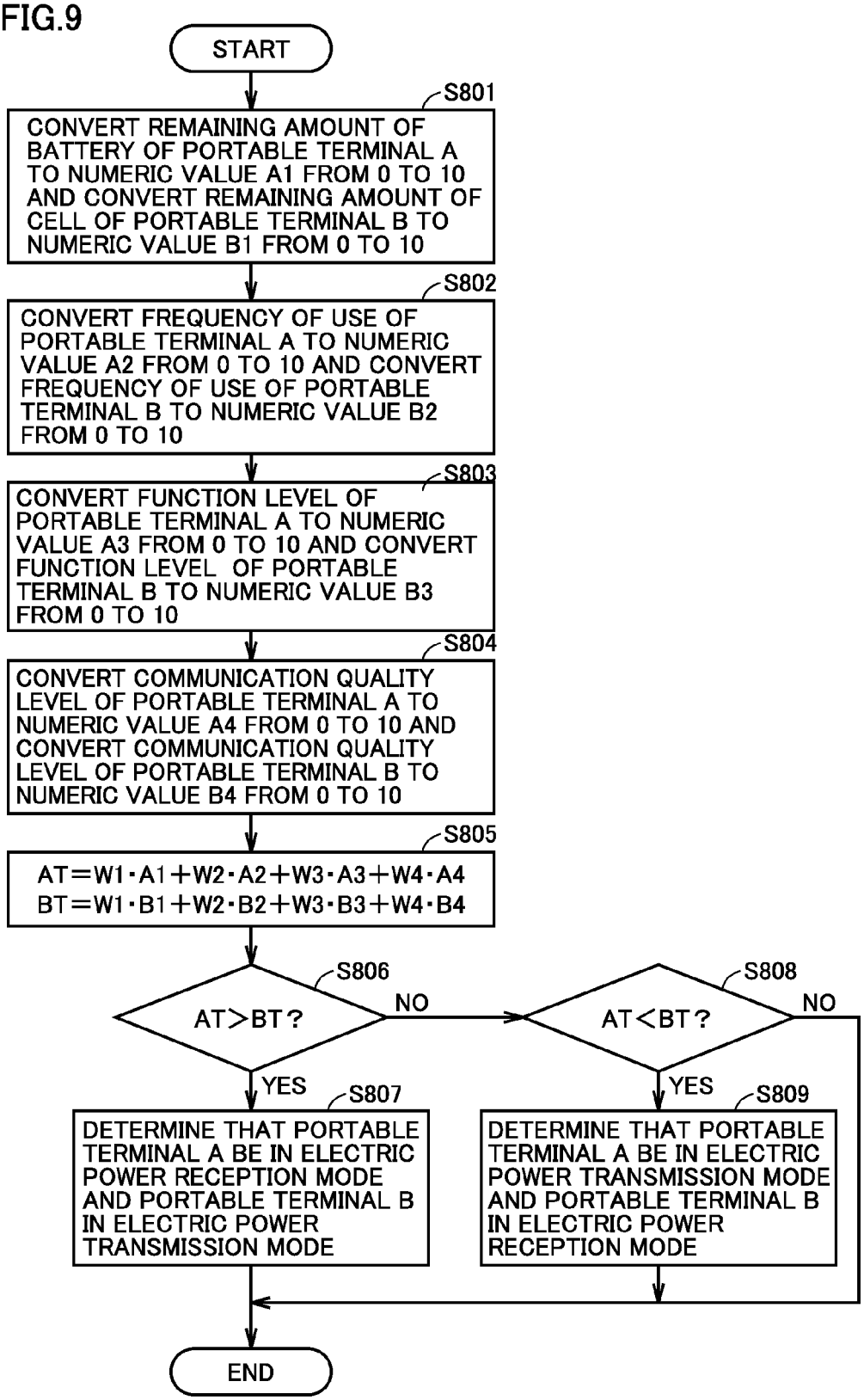
FIG. 9 is a flowchart representing a method of determining a mode in Embodiment 7.

FIG. 9 is a flowchart representing a method of determining a mode in Embodiment 7.

Referring to FIG. 9, in step S801, mode setting module 4b can convert a remaining amount of the battery of portable terminal A to a numeric value A1 from 0 to 10. Mode setting module 4b can convert a remaining amount of the battery of portable terminal B to a numeric value B1 from 0 to 10. Mode setting module 4b can carry out conversion such that numeric values A1 and B1 are greater as a remaining amount of the battery of portable terminals A and B is greater.

In step S802, mode setting module 4b can convert a frequency of use of portable terminal A to a numeric value A2 from 0 to 10. Mode setting module 4b can convert a frequency of use of portable terminal B to a numeric value B2 from 0 to 10. Mode setting module 4b can carry out conversion such that numeric values A2 and B2 are greater as a frequency of use of portable terminals A and B is higher.

In step S803, mode setting module 4b can convert a function level of portable terminal A to a numeric value A3 from 0 to 10. Mode setting module 4b can convert a function level of portable terminal B to a numeric value B3 from 0 to 10. Mode setting module 4b can carry out conversion such that numeric values A3 and B3 are greater as a function level of portable terminals A and B is higher.

In step S804, mode setting module 4b can convert a communication quality level of portable terminal A to a numeric value A4 from 0 to 10. Mode setting module 4b can convert a communication quality level of portable terminal B to a numeric value B4 from 0 to 10. Mode setting module 4b can carry out conversion such that numeric values A4 and B4 are greater as the communication quality level of portable terminals A and B is higher.

In step S805, mode setting module 4b can calculate a weighted sum AT of numeric values A1, A2, A3, and A4 found in steps S801 to S804 and a weighted sum BT of B1, B2, B3, and B4. A weight for A1 and B1 is defined as w1, a weight for A2 and B2 is defined as w2, a weight for A3 and B3 is defined as w3, and a weight for A4 and B4 is defined as w4.

When AT is greater than BT in step S806, the process proceeds to step S807, and when BT is greater than AT, the process proceeds to step S809.

In step S807, mode setting module 4b can decide the mode of portable terminal A on the electric power reception mode and can decide the mode of portable terminal B on the electric power transmission mode.

In step S808, mode setting module 4b can decide the mode of portable terminal A on the electric power transmission mode and can decide the mode of portable terminal B on the electric power reception mode.

Embodiment 8

In Embodiments 1 to 7, a mode of the two portable terminals can be set by exchanging information on a state of use between the two portable terminals. In contrast, in Embodiment 8, a mode of the two portable terminals can be set in response to an instruction from a user.

Figure 10:
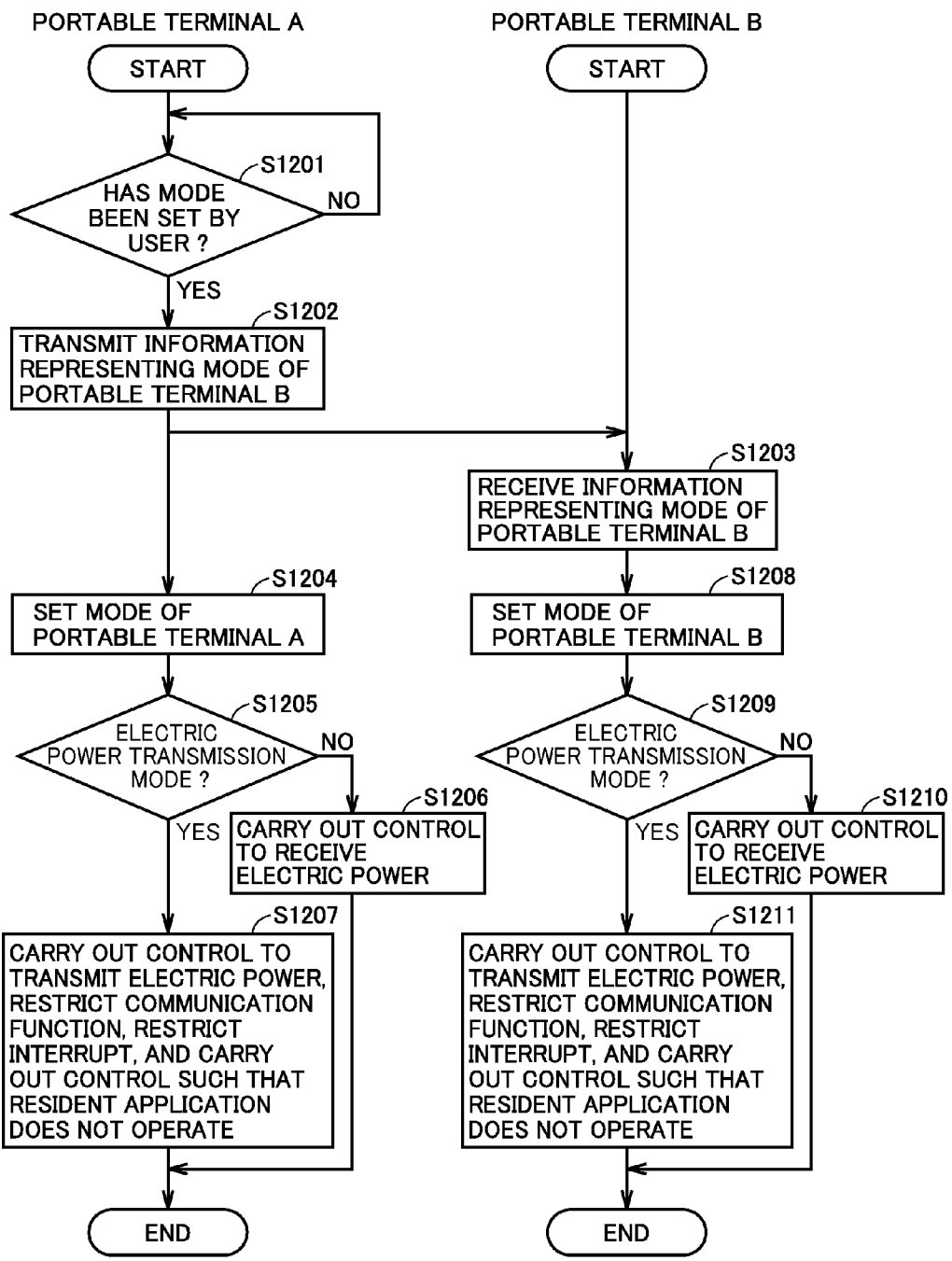
FIG. 10 is a flowchart representing a procedure for transmitting electric power between portable terminal A and portable terminal B in Embodiment 8.

FIG. 10 is a flowchart representing a procedure for electric power transmission between portable terminal A and portable terminal B in Embodiment 8.

Referring to FIG. 10, when input module 5a of portable terminal A receives an instruction for setting a mode of portable terminal A and portable terminal B from a user in step S1201, the process proceeds to step S1202.

In step S1202, USB communication module 7a can transmit the information representing the mode of portable terminal B.

In step S1203, USB communication module 7b of portable terminal B can receive the information representing the mode of portable terminal B.

In step S1204, mode setting module 4a of portable terminal A can set the mode of portable terminal A to the mode indicated by the user in step S1201.

When the electric power transmission mode is set in step S1205, the process proceeds to step S1207, and when the electric power reception mode is set, the process proceeds to step S1206.

In step S1207, electric power control module 3a can carry out control to allow electric power transmission of electric power transmission and electric power reception. Specifically, electric power control module 3a can have switch 10a connected to electric power transmission module 9a and can have electric power transmission module 9a output electric power stored in battery 30a. Electric power control module 3a can restrict a function of communication by radio communication module 2a, can restrict an interrupt by an alarm or the like, and can carry out control such that a resident application does not operate.

In step S1206, electric power control module 3a can carry out control to allow electric power reception of electric power transmission and electric power reception. Specifically, electric power control module 3a can have switch 10a connected to electric power reception module 8a and can have electric power reception module 8a store received electric power in battery 30a.

In step S1208, mode setting module 4b of portable terminal B can set the mode of portable terminal B to the mode received in step S1203.

When the electric power transmission mode is set in step S1209, the process proceeds to step S1211, and when the electric power reception mode is set, the process proceeds to step S1210.

In step S1211, electric power control module 3b can carry out control to allow electric power transmission of electric power transmission and electric power reception. Specifically, electric power control module 3b can have switch 10b connected to electric power transmission module 9b and can have electric power transmission module 9b output electric power stored in battery 30b. Electric power control module 3b can restrict a function of communication by radio communication module 2b, can restrict an interrupt by an alarm or the like, and can carry out control such that a resident application does not operate.

In step S1210, electric power control module 3b can carry out control to allow electric power reception of electric power transmission and electric power reception. Specifically, electric power control module 3b can have switch 10b connected to electric power reception module 8b and can have electric power reception module 8b store received electric power in battery 30b.

(Example of Setting Made by User)

In Embodiment 8, when an incoming call arrives and a user chooses to take the call while the mode of portable terminal A is set to the electric power transmission mode as the mode setting made by the user, the mode of that portable terminal A can be changed to the electric power reception mode and the mode of the other portable terminal B can be changed to the electric power transmission mode. This is because the user has selected use of portable terminal A and the remaining amount of the battery of portable terminal A should be increased.

Figure 11:
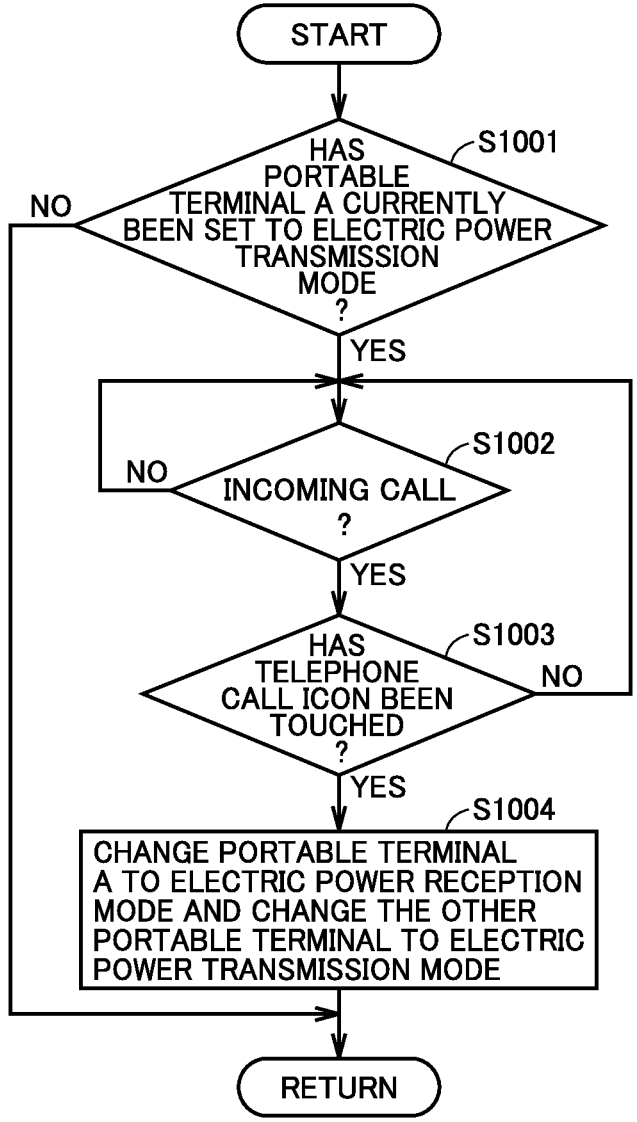
FIG. 11 is a flowchart representing a procedure for setting a mode in response to an instruction from a user in Embodiment 8.
Figure 12:
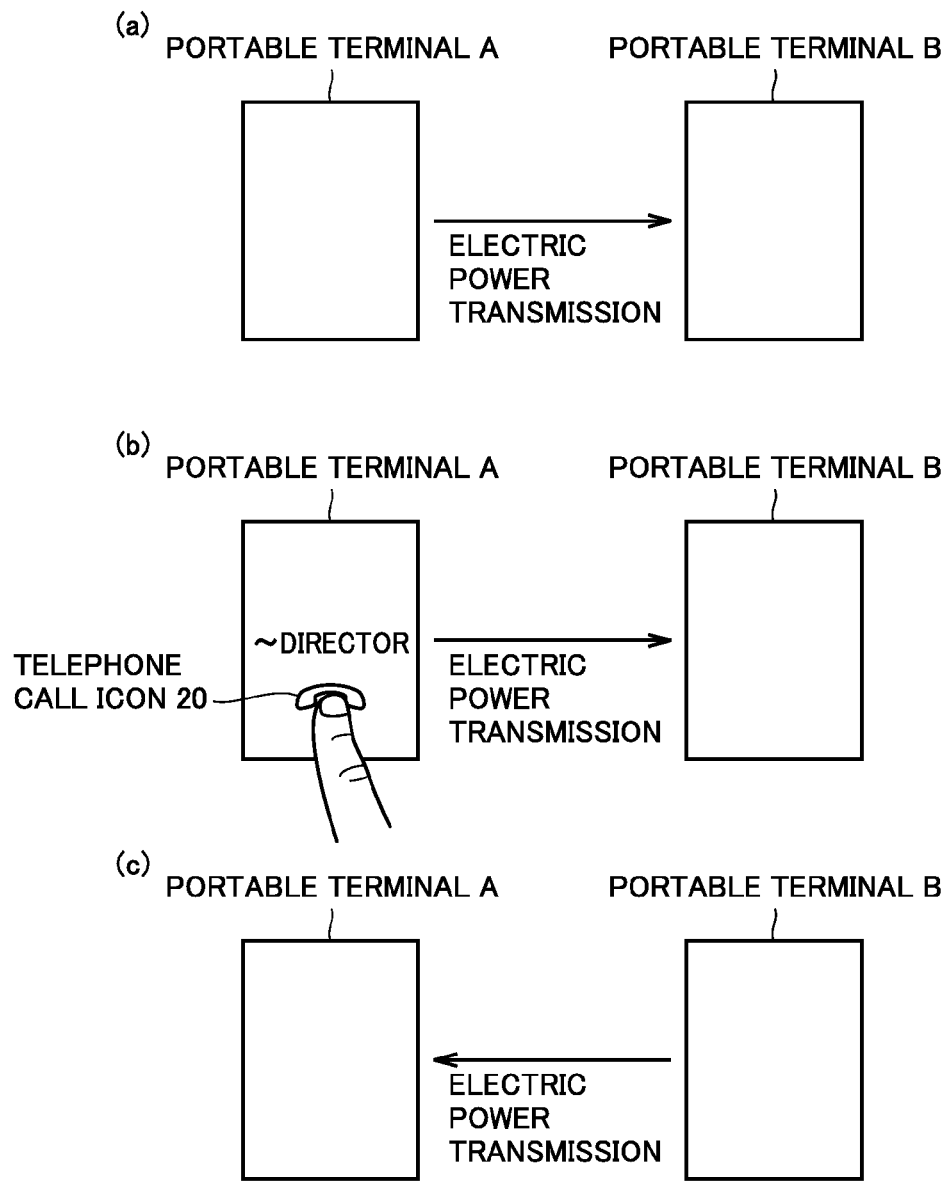
FIG. 12 is a diagram for illustrating an example of mode setting in Embodiment 8.

FIG. 11 is a flowchart representing a procedure for setting a mode in response to an instruction from a user in Embodiment 8. FIG. 12 is a diagram for illustrating an example of mode setting in Embodiment 8. Here, it is assumed that a telephone call function of a portable terminal set to the electric power reception mode is not restricted and an interrupt made by a user's input is not restricted either.

Referring to FIGS. 11 and 12, when portable terminal A has currently been set to the electric power transmission mode in step S1001, the process proceeds to step S1002. FIG. 12 (a) is a diagram representing a situation that the mode of portable terminal A is set to the electric power transmission mode, the mode of portable terminal B is set to the electric power reception mode, and portable terminal A is transmitting electric power to portable terminal B.

When an incoming call arrives at portable terminal A in step S1002, the process proceeds to step S1003.

When the user performs an operation to touch a telephone call icon on a touch panel representing input module 5a in step S1003, the process proceeds to step S1004. FIG. 12 (b) is a diagram representing a situation that a telephone call icon 20 of portable terminal A has been touched.

In step S1004, mode setting module 4a can set portable terminal A to the electric power reception mode and can set the other portable terminal B to the electric power transmission mode. FIG. 12 (c) is a diagram representing a situation that the mode of portable terminal A is changed to the electric power reception mode, the mode of portable terminal B is set to the electric power transmission mode, and portable terminal B is transmitting electric power to portable terminal A.

As above, according to Embodiment 8, when an incoming call arrives at a portable terminal set to the electric power transmission mode and the user chooses to take the call, such a state that electric power in the portable terminal which has received the call runs short and the user can no longer talk can be prevented by switching the mode of that portable terminal to the electric power reception mode and switching the other to the electric power transmission mode.

Though the user inputs an instruction to set a mode in portable terminal A in Embodiment 8, limitation thereto is not intended, and the user may input an instruction to set a mode in portable terminal B. This is also applicable to embodiments below.

Embodiment 9

In Embodiment 9, when the user removes and inserts USB interface cable 50a as mode setting by the user, the mode of portable terminal A and the mode of portable terminal B can be interchanged.

Figure 13:
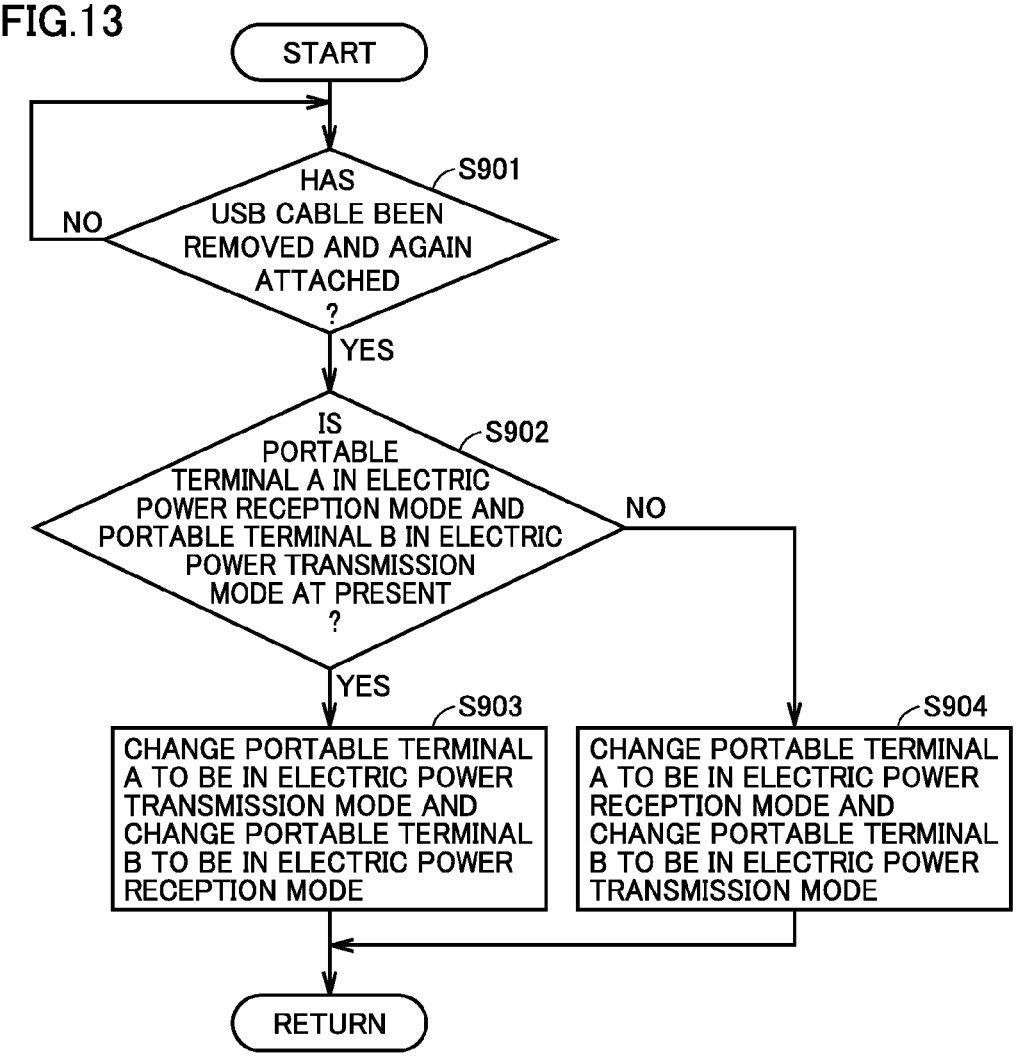
FIG. 13 is a flowchart representing a procedure for setting a mode in response to an instruction from a user in Embodiment 9.

FIG. 13 is a flowchart representing a procedure for setting a mode in response to an instruction from a user in Embodiment 9. Here, it is assumed that an interrupt function to give a notification of USB connection/disconnection is not restricted in the portable terminal set to the electric power reception mode.

Referring to FIG. 13, when the user removes USB interface cable 50a from one or both of portable terminal A and portable terminal B and again attaches USB interface cable 50a in step S901, the process proceeds to step S902.

When portable terminal A is set to the electric power reception mode and the other portable terminal B is set to the electric power transmission mode at present in step S902, the process proceeds to step S903. On the other hand, when portable terminal A is set to the electric power transmission mode and the other portable terminal B is set to the electric power reception mode at present, the process proceeds to step S904.

In step S903, mode setting module 4a can set portable terminal A to the electric power transmission mode and can set the other portable terminal B to the electric power reception mode.

In step S904, mode setting module 4a can set portable terminal A to the electric power reception mode and can set the other portable terminal B to the electric power transmission mode.

As above, according to Embodiment 9, modes of the two portable terminals can be interchanged as the user removes and inserts the USB interface cable.

Embodiment 10

In Embodiment 10, as mode setting made by the user, an electric power transmission mode icon is displayed while the mode of portable terminal A is set to the electric power transmission mode, and when an operation to swipe this electric power transmission mode icon is performed, the mode of portable terminal A can be changed to the electric power reception mode and the mode of the other portable terminal B can be changed to the electric power transmission mode.

Figure 14:
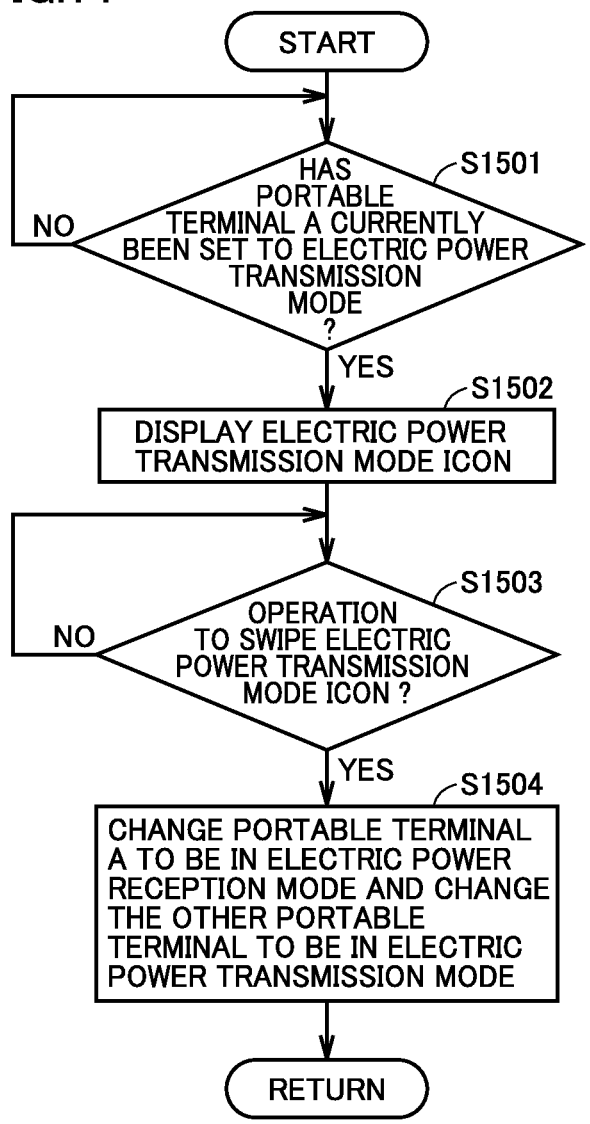
FIG. 14 is a flowchart representing a procedure for setting a mode in response to an instruction from a user in Embodiment 10.
Figure 15:
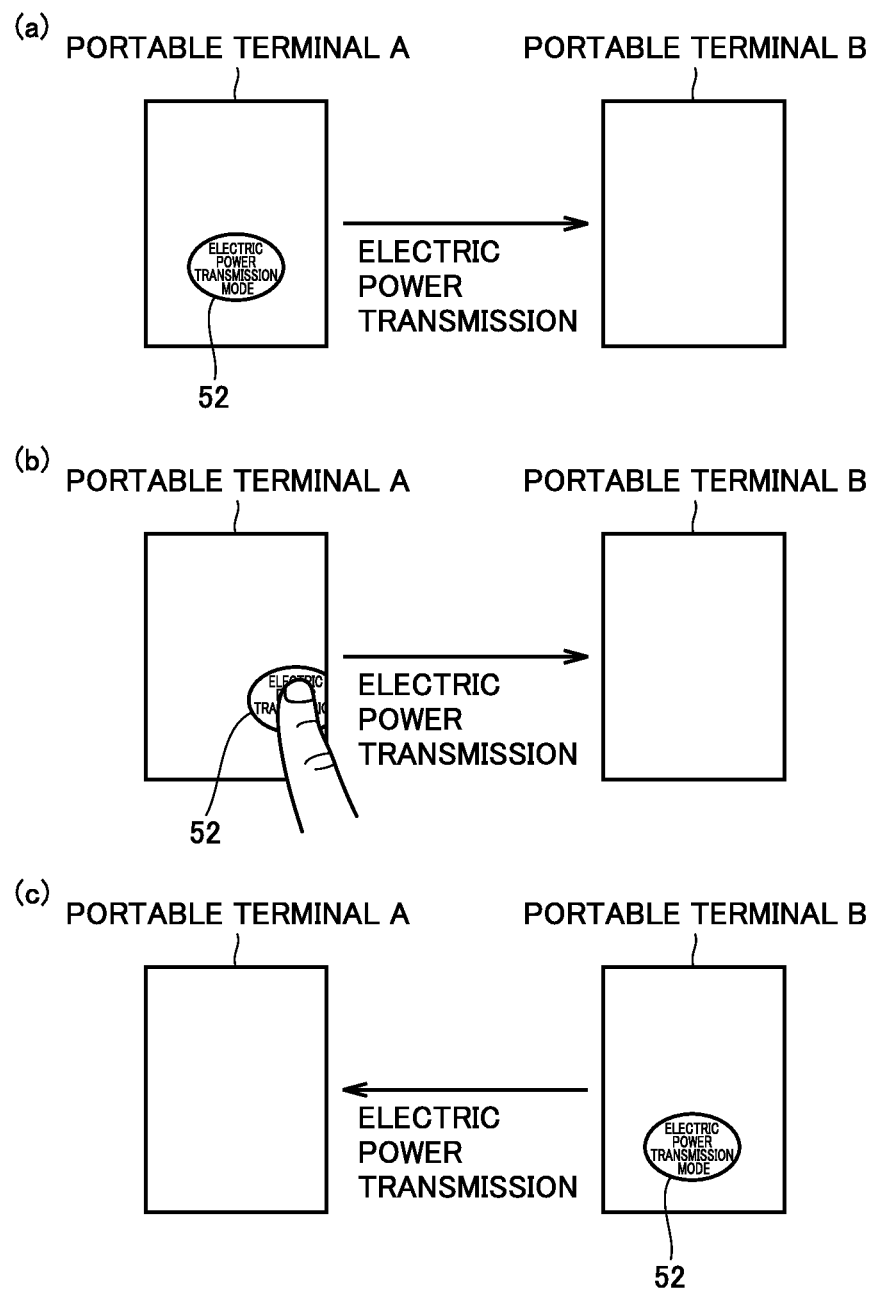
FIG. 15 is a diagram for illustrating an example of mode setting in Embodiment 10.

FIG. 14 is a flowchart representing a procedure for setting a mode in response to an instruction from a user in Embodiment 10. FIG. 15 is a diagram for illustrating an example of mode setting in Embodiment 10. Here, it is assumed that an interrupt made by a user's input is not restricted in the portable terminal set to the electric power reception mode.

Referring to FIGS. 14 and 15, when portable terminal A is currently set to the electric power transmission mode in step S1501, the process proceeds to step S1502.

In step S1502, mode setting module 4a can have display module 6a display the electric power transmission mode icon. FIG. 15 (a) is a diagram representing a situation that the mode of portable terminal A is set to the electric power transmission mode, the mode of portable terminal B is set to the electric power reception mode, and an electric power transmission mode icon 52 is displayed on display module 6a of portable terminal A.

When the user performs an operation to swipe the electric power transmission mode icon on the touch panel representing input module 5a in step S1503, the process proceeds to step S1504. FIG. 15 (b) is a diagram representing a situation that electric power transmission mode icon 52 has been swiped in portable terminal A.

In step S1504, mode setting module 4a can set portable terminal A to the electric power reception mode and can set the other portable terminal B to the electric power transmission mode. FIG. 15 (c) is a diagram representing a situation that the mode of portable terminal A is changed to the electric power reception mode, the mode of portable terminal B is set to the electric power transmission mode, and portable terminal B is transmitting electric power to portable terminal A.

As above, according to Embodiment 10, when the user performs an operation to swipe the electric power transmission mode icon displayed on the display module of the portable terminal set to the electric power transmission mode, by switching the mode of that portable terminal to the electric power reception mode and switching the other to the electric power transmission mode, the modes of the two portable terminals can be interchanged with a simplified operation.

In Embodiment 10, when an electric power reception mode icon is displayed on a display module of a portable terminal set to the electric power reception mode and the user performs an operation to swipe the electric power reception mode icon, the mode of that portable terminal may be switched to the electric power transmission mode and the other may be switched to the electric power reception mode.

Embodiment 11

In Embodiment 11, a set mode can dynamically be changed with change in state of use (a communication quality level) resulting from movement of a user.

Figure 16:
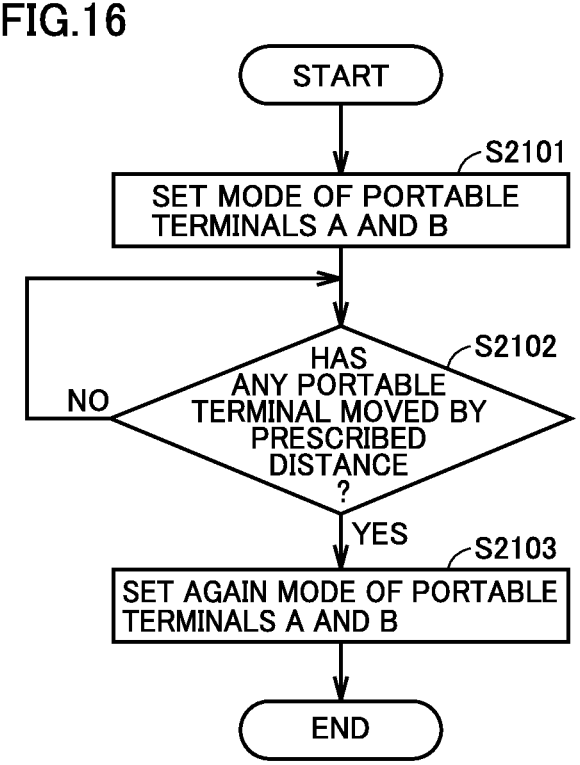
FIG. 16 is a flowchart representing a procedure for mode setting according to Embodiment 11.

FIG. 16 is a flowchart representing a procedure for mode setting according to Embodiment 11.

In step S2101, mode setting modules 4a and 4b can set a mode of portable terminal A and portable terminal B based on a communication quality level of portable terminal A and a communication quality level of portable terminal B and electric power control modules 3a and 3b can allow electric power transmission in the set mode.

In step S2102, when an acceleration sensor or the like detects movement of any portable terminal by a prescribed distance, the process proceeds to step S2103.

In step S2103, mode setting modules 4a and 4b can again set a mode of portable terminal A and portable terminal B based on the communication quality level of portable terminal A and the communication quality level of portable terminal B and electric power control modules 3a and 3b can allow electric power transmission in the set mode.

Thus, for example, when the communication quality level of portable terminal A is lower than the communication quality level of portable terminal B in an area where portable terminal A and portable terminal B are present, portable terminal A can be set to the electric power transmission mode and portable terminal B can be set to the electric power reception mode. Thereafter, when portable terminal A and portable terminal B move and the communication quality level of portable terminal A is higher than the communication quality level of portable terminal B in an area where portable terminal A and portable terminal B which have moved are present, portable terminal A can be set to the electric power reception mode and portable terminal B can be set to the electric power transmission mode. Thus, the user can communicate by using a portable terminal higher in the communication quality level.

Embodiment 12

Embodiment 12 relates to timing of end of transmission of electric power after mode setting.

Figure 17:
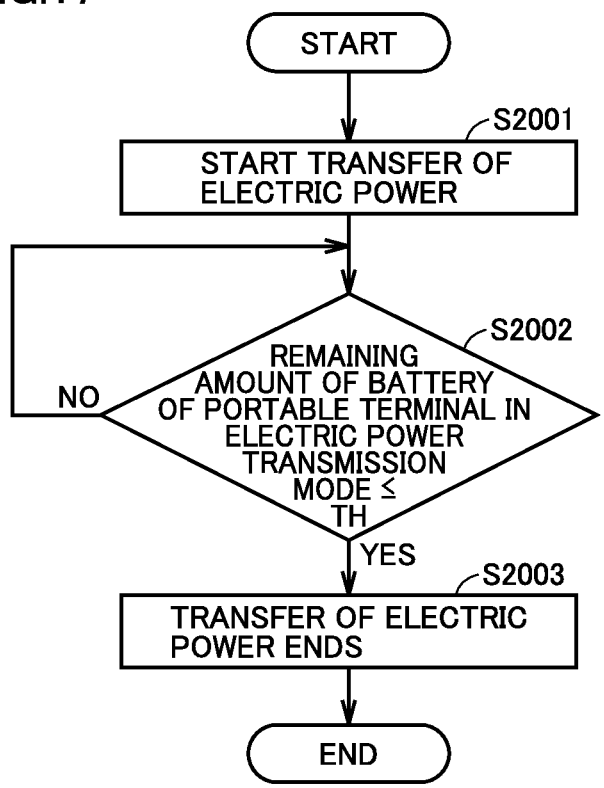
FIG. 17 is a flowchart representing a procedure for electric power transmission according to Embodiment 12.

FIG. 17 is a flowchart representing a procedure for electric power transmission according to Embodiment 12.

Referring to FIG. 17, in step S2001, a portable terminal of portable terminal A and portable terminal B, which has been set to the electric power transmission mode, can start transmission of electric power to the portable terminal set to the electric power reception mode.

When a remaining amount of the battery of the portable terminal set to the electric power transmission mode is equal to or smaller than a prescribed value TH in step S2002, the process proceeds to step S2003.

In step S2003, mode setting module 4a (or 4b) of the portable terminal set to the electric power transmission mode can cancel setting of the electric power transmission mode and electric power control module 3a (or 3b) can have transmission of electric power by electric power transmission module 9a (or 9b) end.

As above, in Embodiment 12, when a remaining amount of the battery of the portable terminal set to the electric power transmission mode decreases to a prescribed value, setting of the electric power transmission mode is canceled and electric power transmission is stopped. Therefore, even the portable terminal set to the electric power transmission mode can make a telephone call, communicate, or execute an application as necessary.

Embodiment 13

Figure 18:
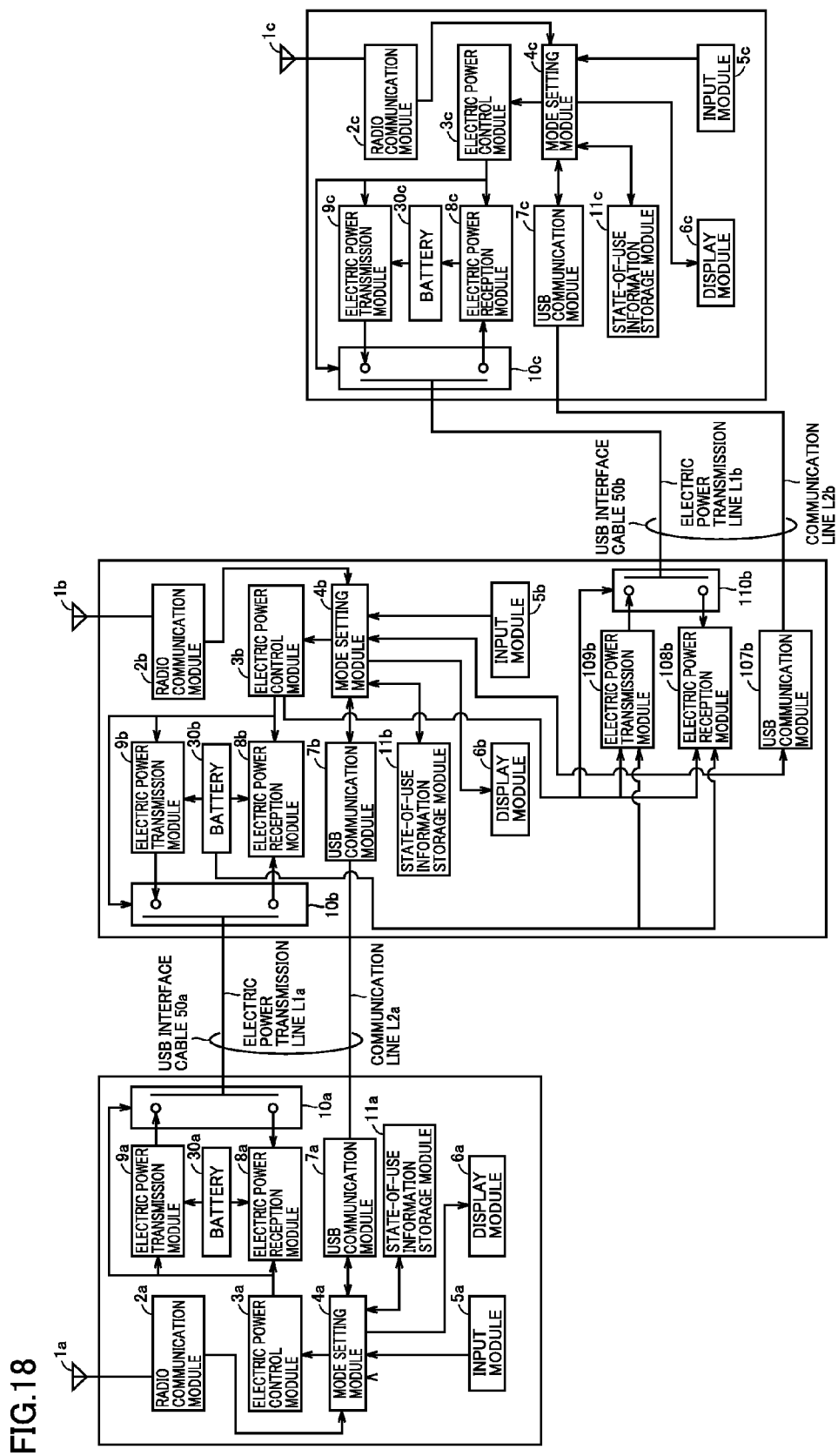
FIG. 18 is a diagram representing an electric power transmission system configured with three portable terminals.

FIG. 18 is a diagram representing an electric power transmission system configured with three portable terminals.

This electric power transmission system is different from the electric power transmission system in FIG. 1 in that a portable terminal C is added and a feature for connection to portable terminal C is added to portable terminal B. Portable terminal C is configured similarly to portable terminal B.

Portable terminal A and portable terminal B can be connected to each other through USB interface cable 50a, and portable terminal B and portable terminal C can be connected to each other through a USB interface cable 50b.

In addition to the features shown in FIG. 1, portable terminal B includes an electric power transmission module 109b, an electric power reception module 108b, a USB communication module 107b, and a switch 110b.

Electric power transmission module 109b can transmit electric power in battery 30b to portable terminal C through an electric power transmission line L1b of USB interface cable 50b.

Electric power reception module 108b can carry out charging with electric power from portable terminal C through electric power transmission line L1b of USB interface cable 50b and can have electric power stored in battery 30b.

Switch 110b can connect electric power transmission line L1b of USB interface cable 50b to electric power transmission module 109b or electric power reception module 108b.

USB communication module 107b can communicate various types of information including information on a state of use with portable terminal C through a communication line L2b of USB interface cable 50b.

Figure 19:
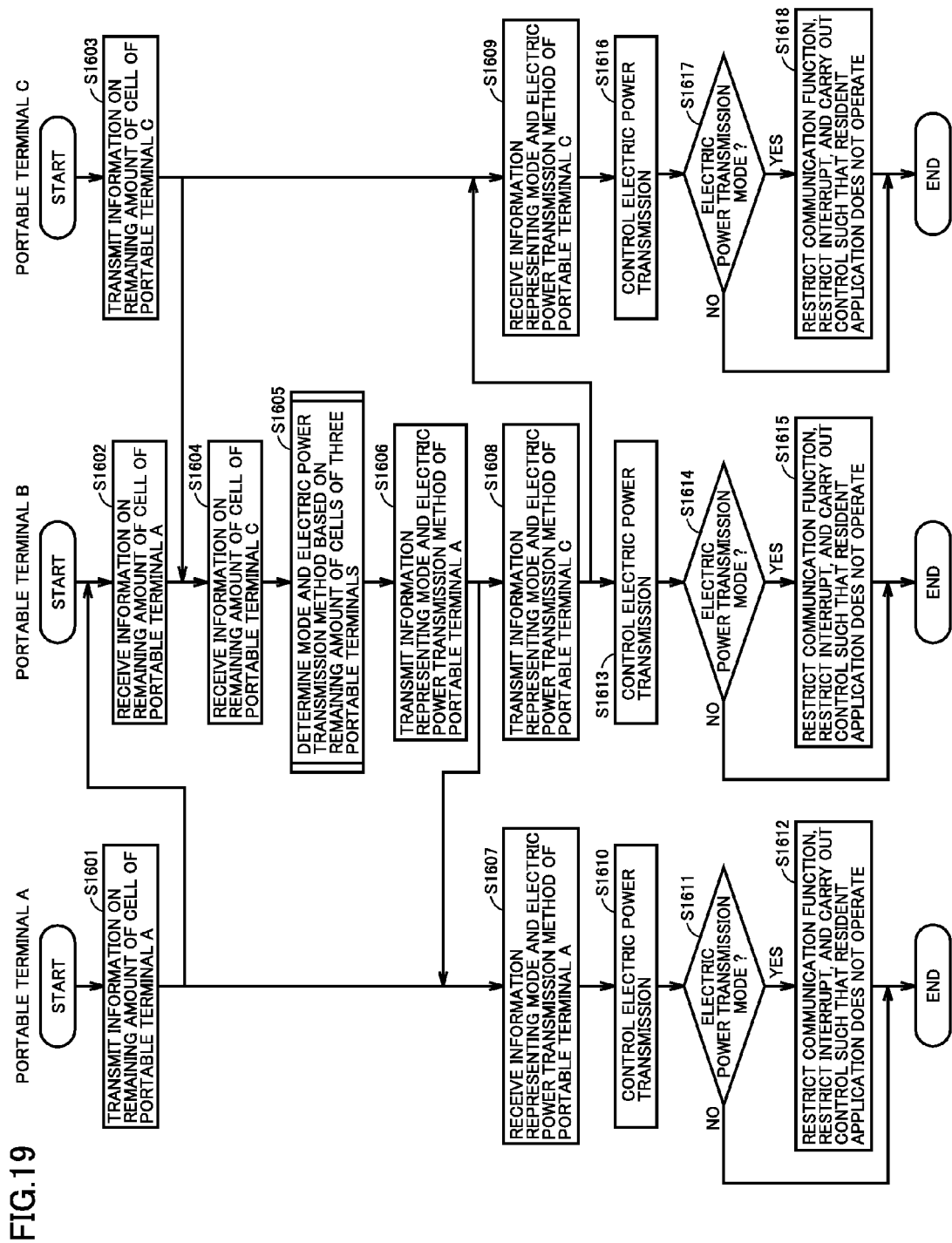
FIG. 19 is a flowchart representing a procedure for electric power transmission among portable terminal A, portable terminal B, and a portable terminal C in Embodiment 13.

FIG. 19 is a flowchart representing a procedure for electric power transmission among portable terminal A, portable terminal B, and portable terminal C in Embodiment 13.

Referring to FIG. 19, in step S1601, mode setting module 4a of portable terminal A can transmit information on a remaining amount of the battery of portable terminal A through USB communication module 7a.

In step S1602, USB communication module 7b of portable terminal B can receive the information on the remaining amount of the battery of portable terminal A.

In step S1603, mode setting module 4c of portable terminal C can transmit information on a remaining amount of the battery of portable terminal C through USB communication module 7c.

In step S1604, USB communication module 107b of portable terminal B can receive the information on the remaining amount of the battery of portable terminal C.

In step S1605, mode setting module 4b of portable terminal B can determine a mode as well as an electric power transmitter and an electric power receiver in electric power transmission, of portable terminal A, portable terminal B, and portable terminal C, based on the received information on the remaining amount of the battery of portable terminal A, information on a remaining amount of the battery of portable terminal B stored in a not-shown memory, and the received information on the remaining amount of the battery of portable terminal C.

In step S1606, USB communication module 7b can transmit information representing the mode and an electric power transmission method of portable terminal A (that is, information on a counterpart of electric power transmission and whether transmission or reception of electric power is to be carried out).

In step S1607, USB communication module 7a of portable terminal A can receive the information representing the mode and the electric power transmission method of portable terminal A.

In step S1608, USB communication module 107b can transmit information representing the mode and an electric power transmission method of portable terminal C.

In step S1609, USB communication module 7c of portable terminal C can receive the information representing the mode and the electric power transmission method of portable terminal C.

In step S1610, mode setting module 4a of portable terminal A can set the mode of portable terminal A to the mode received in step S1607. Electric power control module 3a can have electric power transmission or electric power reception to and from a counterpart carried out in accordance with the electric power transmission method received in step S1607.

When the electric power transmission mode is set in step S1611, the process proceeds to step S1612.

In step S1612, electric power control module 3a can restrict a function of communication by radio communication module 2a, can restrict an interrupt by an alarm or the like, and can carry out control such that a resident application does not operate.

In step S1613, mode setting module 4b of portable terminal B can set the mode of portable terminal B to the mode determined in step S1605. Electric power control module 3b can have electric power transmission or electric power reception to and from an electric power transmission counterpart determined in step S1605.

When the electric power transmission mode is set in step S1614, the process proceeds to step S1615.

In step S1615, electric power control module 3b can restrict a function of communication by radio communication module 2b, can restrict an interrupt by an alarm or the like, and can carry out control such that a resident application does not operate.

In step S1616, mode setting module 4c of portable terminal C can set the mode of portable terminal C to the mode received in step S1609. Electric power control module 3c can have electric power transmission or electric power reception to and from a counterpart carried out in accordance with the electric power transmission method received in step S1609.

When the electric power transmission mode is set in step S1617, the process proceeds to step S1618.

In step S1618, electric power control module 3c can restrict a function of communication by radio communication module 2c, can restrict an interrupt by an alarm or the like, and can carry out control such that a resident application does not operate.

Figure 20:
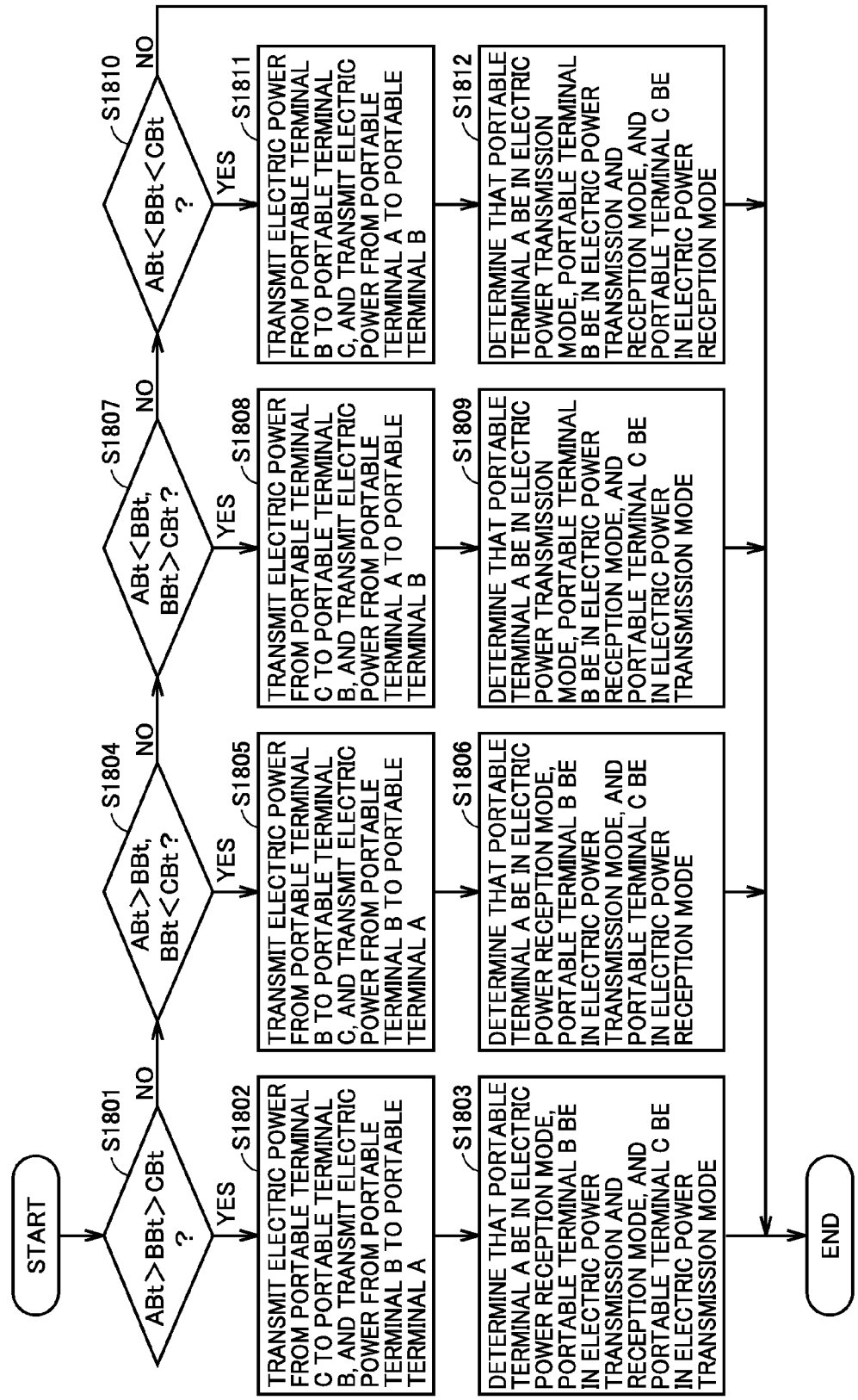
FIG. 20 is a flowchart showing a flow of electric power transmission and a method of determining a mode in Embodiment 13.

FIG. 20 is a flowchart showing a flow of electric power transmission and a method of determining a mode in Embodiment 13.

Referring to FIG. 20, in step S1801, when a remaining amount of the battery ABt of portable terminal A is greater than a remaining amount of the battery BBt of portable terminal B and remaining amount of the battery BBt of portable terminal B is greater than a remaining amount of the battery CBt of portable terminal C, the process proceeds to step S1802.

In step S1802, mode setting module 4b can set portable terminal C as the electric power transmitter and set portable terminal B as the electric power receiver and can set portable terminal B as the electric power transmitter and portable terminal A as the electric power receiver.

In step S1803, mode setting module 4b can determine that portable terminal A be in the electric power reception mode, can set portable terminal B to an electric power transmission and reception mode, and can set portable terminal C to the electric power transmission mode.

Electric power control module 3a of portable terminal A can have switch 10a connected to electric power reception module 8a and can have electric power reception module 8a store received electric power in battery 30a. Electric power control module 3b of portable terminal B can have switch 10b connected to electric power reception module 8b and can have electric power reception module 8b store received electric power in battery 30b. Electric power control module 3b of portable terminal B can have switch 110b connected to electric power reception module 108b and can have electric power reception module 108b store received electric power in battery 30b. Electric power control module 3c of portable terminal C can have switch 10c connected to electric power transmission module 9c and can have electric power transmission module 9c output electric power stored in battery 30c.

In step S1804, when the remaining amount of the battery ABt of portable terminal A is greater than the remaining amount of the battery BBt of portable terminal B and the remaining amount of the battery BBt of portable terminal B is smaller than a remaining amount of the battery CBt of portable terminal C, the process proceeds to step S1805.

In step S1805, mode setting module 4b can determine portable terminal B as the electric power transmitter and portable terminal C as the electric power receiver and can determine portable terminal B as the electric power transmitter and portable terminal A as the electric power receiver.

In step S1806, mode setting module 4b can determine that portable terminal A be in the electric power reception mode, can set portable terminal B to the electric power transmission mode, and can set portable terminal C to the electric power reception mode.

Electric power control module 3a of portable terminal A can have switch 10a connected to electric power reception module 8a and can have electric power reception module 8a store received electric power in battery 30a. Electric power control module 3b of portable terminal B can have switch 10b connected to electric power transmission module 9b and can have electric power transmission module 9b output electric power stored in battery 30c. Electric power control module 3c of portable terminal C can have switch 10c connected to electric power reception module 8c and can have electric power reception module 8c store received electric power in battery 30c. Electric power control module 3b of portable terminal B can have switch 110b connected to electric power transmission module 109b and can have electric power transmission module 109b output electric power stored in battery 30b.

In step S1807, when the remaining amount of the battery ABt of portable terminal A is smaller than the remaining amount of the battery BBt of portable terminal B and the remaining amount of the battery BBt of portable terminal B is greater than the remaining amount of the battery CBt of portable terminal C, the process proceeds to step S1808.

In step S1808, mode setting module 4b can determine portable terminal C as the electric power transmitter and portable terminal B as the electric power receiver and can determine portable terminal A as the electric power transmitter and portable terminal B as the electric power receiver.

In step S1809, mode setting module 4b can determine that portable terminal A be in the electric power transmission mode, can set portable terminal B to the electric power reception mode, and can set portable terminal C to the electric power transmission mode.

Electric power control module 3a of portable terminal A can have switch 10a connected to electric power transmission module 9a and can have electric power transmission module 9a output electric power stored in battery 30a. Electric power control module 3b of portable terminal B can have switch 10b connected to electric power reception module 8b and can have electric power reception module 8b store received electric power in battery 30b. Electric power control module 3b of portable terminal B can have switch 110b connected to electric power reception module 108b and can have electric power reception module 108b store received electric power in battery 30b. Electric power control module 3c of portable terminal C can have switch 10c connected to electric power transmission module 9c and can have electric power transmission module 9c output electric power stored in battery 30c.

In step S1810, when the remaining amount of the battery ABt of portable terminal A is smaller than the remaining amount of the battery BBt of portable terminal B and the remaining amount of the battery BBt of portable terminal B is smaller than the remaining amount of the battery CBt of portable terminal C, the process proceeds to step S1811.

In step S1811, mode setting module 4b can determine portable terminal B as the electric power transmitter and portable terminal C as the electric power receiver, and can determine portable terminal A as the electric power transmitter and portable terminal B as the electric power receiver.

In step S1812, mode setting module 4b can determine that portable terminal A be in the electric power transmission mode, can set portable terminal B to the electric power transmission and reception mode, and can set portable terminal C to the electric power reception mode.

Electric power control module 3a of portable terminal A can have switch 10a connected to electric power transmission module 9a and can have electric power transmission module 9a output electric power stored in battery 30a. Electric power control module 3b of portable terminal B can have switch 10b connected to electric power reception module 8b and can have electric power reception module 8b store received battery in battery 30b. Electric power control module 3c of portable terminal C can have switch 10c connected to electric power reception module 8c and can have electric power reception module 8c store received electric power in battery 30c, and electric power control module 3b of portable terminal B can have switch 110b connected to electric power transmission module 109b and can have electric power transmission module 109b output electric power stored in battery 30b.

As above, in Embodiment 13, transmission of electric power in accordance with each remaining amount of a cell can be carried out also among three portable terminals.

(Modification)

The present disclosure is not limited to embodiments above, and a modification, for example, as below, is also encompassed.

(1) Electronic Device

Though a portable terminal such as a smartphone or a feature phone has been described as one example of electronic devices in embodiments above, the electronic device in the present disclosure is not limited to a portable terminal and a terminal such as a personal computer or a tablet is also encompassed.

(2) Transmission of Electric Power

Though electric power is transmitted between two portable terminals through a USB interface cable in embodiments, limitation thereto is not intended, and electric power may be transmitted between two portable terminals in a non-contact manner.

(3) Change in Mode

Exchange of information on a state of use among a plurality of portable terminals and setting of a mode based on the state of use of the plurality of portable terminals in Embodiments 1 to 7 and 11 may be carried out every certain period. Thus, modes of the plurality of portable terminals can dynamically be changed.

Though embodiments have been described, it should be understood that embodiments disclosed herein are illustrative and non-restrictive in every respect. The scope of the present disclosure is defined by the terms of the claims, and is intended to include any modifications within the scope and meaning equivalent to the terms of the claims.

The invention claimed is:

1. An electronic device, comprising:
   a battery;
   an electric power transmission module configured to be able to transmit electric power in said battery to another electronic device;
   an electric power reception module configured to be able to receive electric power from said another electronic device and have received electric power stored in said battery;
   a setting module configured to set a mode of said electronic device to an electric power transmission mode or an electric power reception mode based on a state of use of said electronic device and said another electronic device; and
   a control module configured to allow electric power transmission when said electric power transmission mode is set and allow electric power reception when said electric power reception mode is set, wherein
   said setting module is configured to set the mode of said electronic device to said electric power reception mode when said another electronic device is out of coverage and said electronic device is within coverage and set the mode of said electronic device to said electric power transmission mode when said another electronic device is within coverage and said electronic device is out of coverage.

2. The electronic device according to claim 1, wherein said setting module is configured to transmit information on the state of use of said electronic device to said another electronic device, receive an instruction to set the mode of said electronic device from said another electronic device, and set said electronic device to one of said electric power transmission mode and said electric power reception mode based on the instruction.

3. The electronic device according to claim 1, wherein said setting module is configured to receive information on the state of use of said another electronic device from said another electronic device, and determine the mode of said electronic device and the mode of said another electronic device based on the state of use of said electronic device and the state of use of said another electronic device.

4. The electronic device according to claim 1, wherein when a remaining amount of a cell of said electronic device decreases to a prescribed value while said electronic device is set to said electric power transmission mode, said control module is configured to stop said electric power transmission.

5. The electronic device according to claim 1, wherein said control module is configured to restrict a communication function when said electric power transmission mode is set.

6. The electronic device according to claim 1, wherein said control module is configured to restrict an interrupt when said electric power transmission mode is set.

7. The electronic device according to claim 1, wherein said control module is configured to carry out control such that a resident application does not operate when said electric power transmission mode is set.

8. The electronic device according to claim 1, wherein said electronic device and said another electronic device are configured to be connected to each other through a USB interface cable.

9. An electronic device, comprising:
   a battery;
   an electric power transmission module configured to be able to transmit electric power in said battery to another electronic device;
   an electric power reception module configured to be able to receive electric power from said another electronic device and have received electric power stored in said battery;
   a setting module configured to set a mode of said electronic device to an electric power transmission mode or an electric power reception mode based on a state of use of said electronic device and said another electronic device; and
   a control module configured to allow electric power transmission when said electric power transmission mode is set and allow electric power reception when said electric power reception mode is set, wherein
   said setting module is configured to set the mode of said electronic device to said electric power transmission mode when a frequency of use of said electronic device is lower than a frequency of use of said another electronic device and set the mode of said electronic device to said electric power reception mode when the frequency of use of said electronic device is higher than the frequency of use of said another electronic device.

10. An electronic device, comprising:
    a battery;
    an electric power transmission module configured to be able to transmit electric power in said battery to another electronic device;
    an electric power reception module configured to be able to receive electric power from said another electronic device and have received electric power stored in said battery;
    a setting module configured to set a mode of said electronic device to an electric power transmission mode or an electric power reception mode based on a state of use of said electronic device and said another electronic device; and
    a control module configured to allow electric power transmission when said electric power transmission mode is set and allow electric power reception when said electric power reception mode is set, wherein
    said setting module is configured to set the mode of said electronic device to said electric power transmission mode or said electric power reception mode based on comparison between a weighted sum of numeric values obtained by converting a remaining amount of a cell, a frequency of use, a function level, and a communication quality level of said another electronic device to numeric values and a weighted sum of numeric values obtained by converting a remaining amount of a cell, a frequency of use, a function level, and a communication quality level of said electronic device to numeric values.

11. An electronic device, comprising:

a battery;

an electric power transmission module configured to be able to transmit electric power in said battery to another electronic device;

an electric power reception module configured to be able to receive electric power from said another electronic device and have received electric power stored in said battery;

a setting module configured to set a mode of said electronic device to an electric power transmission mode or an electric power reception mode in response to an operation by a user; and a control module configured to allow electric power transmission when said electric power transmission mode is set and allow electric power reception when said electric power reception mode is set, wherein said electronic device and said another electronic device are configured to be connectable to each other through a USB interface cable, and said setting module is configured to change the mode of said electronic device from a current mode when said USB interface cable is removed from said electronic device or said another electronic device and said USB interface cable is again attached to said electronic device or said another electronic device.

12. An electronic device, comprising:

a battery;

an electric power transmission module configured to be able to transmit electric power in said battery to another electronic device;

an electric power reception module configured to be able to receive electric power from said another electronic device and have received electric power stored in said battery;

a setting module configured to set a mode of said electronic device to an electric power transmission mode or an electric power reception mode in response to an operation by a user; and a control module configured to allow electric power transmission when said electric power transmission mode is set and allow electric power reception when said electric power reception mode is set, wherein said setting module is configured to have said another electronic device switch to a mode displayed by said mode icon and change the mode of said electronic device from the current mode when an operation to swipe said mode icon is input.

13. An electronic device, comprising:

a battery;

an electric power transmission module configured to be able to transmit electric power in said battery to another electronic device;

an electric power reception module configured to be able to receive electric power from said another electronic device and have received electric power stored in said battery;

a setting module configured to set a mode of said electronic device to an electric power transmission mode or an electric power reception mode in response to an operation by a user; and a control module configured to allow electric power transmission when said electric power transmission mode is set and allow electric power reception when said electric power reception mode is set, wherein said setting module is configured to set the mode of said electronic device to said electric power reception mode and set the mode of said another electronic device to said electric power transmission mode when an incoming call arrives and a user performs an operation to choose to take a telephone call while said electric power transmission mode is set.

* * * * *